US012609754B2

(12) United States Patent
Jassal et al.

(10) Patent No.: US 12,609,754 B2
(45) Date of Patent: Apr. 21, 2026

(54) METHODS FOR JOINT BEAM MANAGEMENT, MOBILITY AND MULTIPLE BASE STATION TRANSMISSION

(71) Applicant: HUAWEI TECHNOLOGIES CO., LTD., Guangdong (CN)

(72) Inventors: Aman Jassal, Kanata (CA); Amine Maaref, Kanata (CA); Jianglei Ma, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 18/361,889

(22) Filed: Jul. 30, 2023

(65) Prior Publication Data

US 2023/0370150 A1    Nov. 16, 2023

Related U.S. Application Data

(63) Continuation of application No. PCT/CN2021/074945, filed on Feb. 2, 2021.

(51) Int. Cl.
*H04B 7/08*        (2006.01)
*H04W 72/23*       (2023.01)

(52) U.S. Cl.
CPC ............ *H04B 7/088* (2013.01); *H04W 72/23* (2023.01)

(58) Field of Classification Search
CPC ............................... H04B 7/088; H04W 72/23
See application file for complete search history.

(56) References Cited

U.S. PATENT DOCUMENTS

| | | | |
|---|---|---|---|
| 2018/0219606 A1 | 8/2018 | Ng et al. | |
| 2020/0014454 A1 | 1/2020 | Guo et al. | |
| 2020/0059951 A1 | 2/2020 | Frenne et al. | |
| 2023/0047505 A1 * | 2/2023 | Zhang .................. | H04W 16/28 |

FOREIGN PATENT DOCUMENTS

| | | |
|---|---|---|
| CN | 110392438 A | 10/2019 |
| CN | 110402550 A | 11/2019 |
| WO | 2020198993 A1 | 10/2020 |

OTHER PUBLICATIONS

Vivo, "Further discussion on multi beam enhancement", 3GPP TSG RAN WG1 #103-e, R1-2007644, Nov. 1, 2020, 26 pages.
"3rd Generation Partnership Project; Technical Specification Group Radio Access Network; NR; Physical channels and modulation (Release 16)". 3GPP TS 38.211 V16.4.0. Technical specification. Dec. 2020. 133 pages.

(Continued)

*Primary Examiner* — Ronald B Abelson
(74) *Attorney, Agent, or Firm* — Slater Matsil, LLP

(57)        ABSTRACT

Aspects of the present disclosure provide a manner of associating a physical layer channel, such as, but not limited to, physical broadcast channel (PBCH), physical downlink control channel (PDCCH), and physical uplink control channel (PUCCH) and a receive beam assumption. The beam assumption may, for example, relate a receive beam direction with a reference signal transmitted by a base station in which the reference signal is used for any of multiple uses by a user equipment (UE), such as beam management, multiple BS, including terrestrial BS and/or non-terrestrial BS, and UE mobility.

20 Claims, 12 Drawing Sheets

(56) References Cited

OTHER PUBLICATIONS

"3rd Generation Partnership Project; Technical Specification Group Radio Access Network; NR; Multiplexing and channel coding (Release 16)". 3GPP TS 38.212 V16.4.0. Technical specification. Dec. 2020. 152 pages.

"3rd Generation Partnership Project; Technical Specification Group Radio Access Network; NR; Physical layer procedures for control (Release 16)". 3GPP TS 38.213 V16.4.0. Technical specification. Dec. 2020. 181 pages.

"3rd Generation Partnership Project; Technical Specification Group Radio Access Network; NR; Physical layer procedures for data (Release 16)". 3GPP TS 38.214 V16.4.0. Technical specification. Dec. 2020. 169 pages.

"3rd Generation Partnership Project; Technical Specification Group Radio Access Network; NR; Radio Resource Control (RRC) protocol specification (Release 16)". 3GPP TS 38.331 V16.3.1. Technical specification. Jan. 2021. 932 pages.

* cited by examiner

651 ~ CORESET for PDCCH for BS#0
652 ~ CORESET for PDCCH for BS#1
653 ~ CSI-RS

1051 — □ CORESET for PDCCH for T-BS
1052 — ▨ CORESET for PDCCH for NT-BS
1053 — ▨ CSI-RS

METHODS FOR JOINT BEAM MANAGEMENT, MOBILITY AND MULTIPLE BASE STATION TRANSMISSION

CROSS-REFERENCE TO RELATED APPLICATIONS

This application is a continuation of International Application No. PCT/CN2021/074945, filed on Feb. 2, 2021, which is hereby incorporated by reference in its entirety.

TECHNICAL FIELD

The present disclosure relates generally to wireless communications, and in particular embodiments, methods for joint beam management, mobility and multi-base station transmission.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Moving forward, wireless networks are expected to support massive connectivity, high capacity, ultra-reliability and low latency. It is envisioned that multiple transmit and receive points (multi-TRPs) will be used in order to improve network characteristics such reliability, coverage, and capacity performance through flexible deployment scenarios. For example, to be able to support the increased growth in mobile data traffic and to enhance the coverage, wireless devices are expected to access networks composed of multi-TRPs. TRPs may include macro-cells, small cells, pico-cells, femto-cells, remote radio heads, relay nodes, drones, balloons, high-altitude platforms and satellites.

Current solutions for beam management procedures in cellular systems are based on using quasi-colocation (QCL) indications linking a physical downlink shared channel (PDSCH) with a certain beam assumption. A beam assumption in its simplest form may be described as an implementation of spatial filtering used for directional communication in beam-based systems. Such spatial filtering results in a beam which allow devices (e.g. network devices or UEs) to focus signals in a certain region of space, i.e. a certain direction. The beam assumption may include information about a direction that a beam may be best received at the receiver or a direction that the beam may be transmitted at the transmitter. Additionally, in beam-based implementations the UE looks for synchronization signals (for example, synchronization signal/physical broadcast channel (SS/PBCH) blocks) transmitted in "SS bursts" in order to perform initial access and synchronize with the network.

Mobility management procedures in cellular systems are based on measurements of reference signals sent by serving and non-serving cells. Similarly the mobility reporting framework is premised around cell-based events. An example of such a cell-based event is the signaling received from a first cell becoming stronger than the signaling from a second cell. Such cell-based events may be based on reference signal received power (RSRP). measurements, based on the premise that only one end of a link, typically the UE, are mobile.

Multi-TRP transmissions are based on control resource set (CORESET) pools. A CORESET is a set of physical resources and a set of parameters that is used to carry physical downlink control channel (PDCCH) or downlink control information (DCI) and a CORESET poll is a set of possible CORESETs. A CORESET pool may be explicitly configured to a UE and the UE monitors those CORESETs for PDCCH transmissions scheduling physical downlink shared channel (PDSCH) transmissions carrying UE-specific data. However, this doesn't include a common CORESET (also referred to as CORESET #0) carrying PDCCHs for system information and paging (SI/Paging) information, which is by default associated to a TRP that the UE is being primarily associated with.

SUMMARY

Embodiments of the application introduce using a grouping of parameters including an identification of a physical layer channel and an associated receive beam assumption in a manner that the grouping can be used for a variety of purposes in a beam-based implementation, such as beam management, UE mobility and multiple BS scenarios.

Using grouping of a physical layer channel and an associated receive beam assumption by the network for mobility purposes may provide a smooth mobility experience as the UE can be transferred from one BS to another seamlessly. Also, in some embodiments in which the network controls mobility measurements, the network controls which neighbor BSs the UE monitors system information for, enabling smooth mobility experiences.

Using grouping of a physical layer channel and an associated receive beam assumption by the network for multi-BS purposes may provide reliable multi-BS transmission because the UE can maintain full connectivity with the network when beam-failure occurs on one of the physical layer channels of a grouping. For example, the UE may continue to receive control information and UE-specific data. Also, in some embodiments in which the network controls user experience, the network controls which BSs the UE listens to at any given time. Therefore, the UE does not necessarily waste time and processing power detecting and measuring radio links from BSs that the network determines as being not of interest to the UE.

Using grouping of a physical layer channel and an associated receive beam assumption by the network for multi-BS purposes may provide a smooth transition between beams because UEs can be transferred from one grouping to another seamlessly. Also, in some embodiments in which the network controls beam measurements, the network controls which BSs the UE monitors beams for, thereby enabling smooth beam transition as above.

According to some embodiments of the application, there is provided a method involving: transmitting configuration information, the configuration information including at least one grouping of information, each grouping of information including an identification of a physical layer channel and information pertaining to a receive beam for a receiver to receive the physical layer channel; and transmitting an identification of a selected grouping of information of the at least one grouping of information to configure user equipment (UE) based on the selected grouping.

In some embodiments, the selected grouping of information can be used for UE functionality that includes at least one of: UE mobility within the network; UE receiving physical layer signaling from multiple network devices; UE beam management; or UE operation using a terrestrial network or a non-terrestrial network.

In some embodiments, transmitting the identification of the physical layer channel involves transmitting one or more of: identification of a physical layer channel type; and physical layer channel configuration information for the physical layer channel type.

In some embodiments, transmitting the information pertaining to the receive beam involves transmitting at least one of: beam direction information; and reference signal configuration information.

In some embodiments, the beam direction information includes one or more of: a beam direction azimuth angle; a beam direction azimuth angle range; a beam direction zenith angle; a beam direction zenith angle range; and information associating a transmit beam and a receive beam at the UE.

In some embodiments, the reference signal configuration information includes one or more of: reference signal type information; reference signal time periodicity information; and reference signal frequency occupation information.

In some embodiments, the transmitting the configuration information including the grouping of the identification of the physical layer channel and the information pertaining to a receive beam includes transmitting one of: an identification of a physical broadcast channel (PBCH) and channel state information reference signal (CSI-RS) information; an identification of a physical downlink control channel (PDCCH) and CSI-RS information; or an identification of a physical uplink control channel (PUCCH) and CSI-RS information.

In some embodiments, transmitting configuration information including transmitting the configuration information in a higher layer signaling; and transmitting the identification of the selected grouping of information includes transmitting the identification in a lower layer signaling.

According to some embodiments of the application, there is provided an apparatus that includes a processor and a computer-readable storage memory. The computer-readable storage memory has stored thereon, computer executable instructions that when executed, cause the apparatus to: transmit configuration information, the configuration information including at least one grouping of information, each grouping of information including an identification of a physical layer channel and information pertaining to a receive beam for a receiver to receive the physical layer channel; and transmit an identification of a selected grouping of information of the at least one grouping of information to configure user equipment (UE) based on the selected grouping.

In some embodiments, the selected grouping of information can be used for UE functionality that includes at least one of: UE mobility within the network; UE receiving physical layer signaling from multiple network devices; UE beam management; or UE operation using a terrestrial network or a non-terrestrial network.

In some embodiments, the computer executable instructions that when executed cause the apparatus to transmit the identification of the physical layer channel, cause the apparatus to transmit one or more of: identification of a physical layer channel type; and physical layer channel configuration information for the physical layer channel type.

In some embodiments, the computer executable instructions that when executed cause the apparatus to transmit the information pertaining to the receive beam, cause the apparatus to transmit at least one of: beam direction information; and reference signal configuration information.

In some embodiments, the beam direction information includes one or more of: a beam direction azimuth angle; a beam direction azimuth angle range; a beam direction zenith angle; a beam direction zenith angle range; and associating a transmit beam and a receive beam at the UE.

In some embodiments, the reference signal configuration information includes one or more of: reference signal type information; reference signal time periodicity information; and reference signal frequency occupation information.

In some embodiments, the computer executable instructions that when executed cause the apparatus to transmit the configuration information including the grouping of the identification of the physical layer channel and the information pertaining to a receive beam, cause the apparatus to transmit one of: an identification of a physical broadcast channel (PBCH) and channel state information reference signal (CSI-RS) information; an identification of a physical downlink control channel (PDCCH) and CSI-RS information; or an identification of a physical uplink control channel (PUCCH) and CSI-RS information.

In some embodiments, transmitting configuration information involves transmitting the configuration information in a higher layer signaling; and transmitting the identification of the selected grouping of information involves transmitting the identification in a lower layer signaling.

According to some embodiments of the application, there is provided a method involving a UE receiving configuration information, the configuration information including at least one grouping of information, each grouping of information including an identification of a physical layer channel and information pertaining to a receive beam for a receiver to receive signaling on the physical layer channel; the UE receiving an identification of a selected grouping of information of the at least one grouping of information to configure the UE based on the selected grouping.

In some embodiments, the selected grouping of information can be used for UE functionality that includes at least one of: UE mobility within the network; UE receiving physical layer signaling from multiple network devices; UE beam management; or UE operation using a terrestrial network or a non-terrestrial network.

In some embodiments, receiving the identification of the physical layer channel involves receiving one or more of: identification of a physical layer channel type; and physical layer channel configuration information for the physical layer channel type.

In some embodiments, receiving the information pertaining to the receive beam involves receiving at least one of: beam direction information; and reference signal configuration information.

In some embodiments, the beam direction information includes one or more of: a beam direction azimuth angle; a beam direction azimuth angle range; a beam direction zenith angle; a beam direction zenith angle range; and information associating a transmit beam and a receive beam at the UE.

In some embodiments, the reference signal configuration information includes one or more of: reference signal type information; reference signal time periodicity information; and reference signal frequency occupation information.

In some embodiments, the receiving the configuration information including the grouping of the identification of the physical layer channel and the information pertaining to a receive beam includes receiving one of: an identification of a physical broadcast channel (PBCH) and channel state information reference signal (CSI-RS) information; an identification of a physical downlink control channel (PDCCH) and CSI-RS information; or an identification of a physical uplink control channel (PUCCH) and CSI-RS information.

In some embodiments, the UE receiving configuration information involves the UE receiving the configuration information in a higher layer signaling; and the UE receiving the identification of the selected grouping of information involves the UE receiving the identification in a lower layer signaling.

According to some embodiments of the application, there is provided an apparatus that includes a processor and a computer-readable storage memory. The computer-readable storage memory has stored thereon, computer executable instructions that when executed, cause the apparatus to receive configuration information, the configuration information including at least one grouping of information, each grouping of information including an identification of a physical layer channel and information pertaining to a receive beam for a receiver to receive signaling on the physical layer channel; and receive an identification of a selected grouping of information of the at least one grouping of information to configure the UE based on the selected grouping.

In some embodiments, the selected grouping of information can be used UE functionality that involves at least one of: UE mobility within the network; UE receiving physical layer signaling from multiple network devices; UE beam management; or UE operation using a terrestrial network or a non-terrestrial network.

In some embodiments, the computer executable instructions that when executed cause the apparatus to receive the identification of the physical layer channel, cause the apparatus to receive one or more of: identification of a physical layer channel type; and physical layer channel configuration information for the physical layer channel type.

In some embodiments, the computer executable instructions that when executed cause the apparatus to receive the information pertaining to the receive beam, cause the apparatus to receive at least one of: beam direction information; and reference signal configuration information.

In some embodiments, the beam direction information includes one or more of: a beam direction azimuth angle; a beam direction azimuth angle range; a beam direction zenith angle; a beam direction zenith angle range; and information associating a transmit beam and a receive beam at the UE.

In some embodiments, the reference signal configuration information includes one or more of: reference signal type information; reference signal time periodicity information; and reference signal frequency occupation information.

In some embodiments, the computer executable instructions that when executed cause the apparatus to receive the configuration information including the grouping of the identification of the physical layer channel and the information pertaining to a receive beam, cause the apparatus to receive one of: an identification of a physical broadcast channel (PBCH) and channel state information reference signal (CSI-RS) information; an identification of a physical downlink control channel (PDCCH) and CSI-RS information; or an identification of a physical uplink control channel (PUCCH) and CSI-RS information.

In some embodiments, receiving configuration information involves the apparatus receiving the configuration information in a higher layer signaling; and receiving the identification of the selected grouping of information involves the apparatus receiving the identification in a lower layer signaling.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
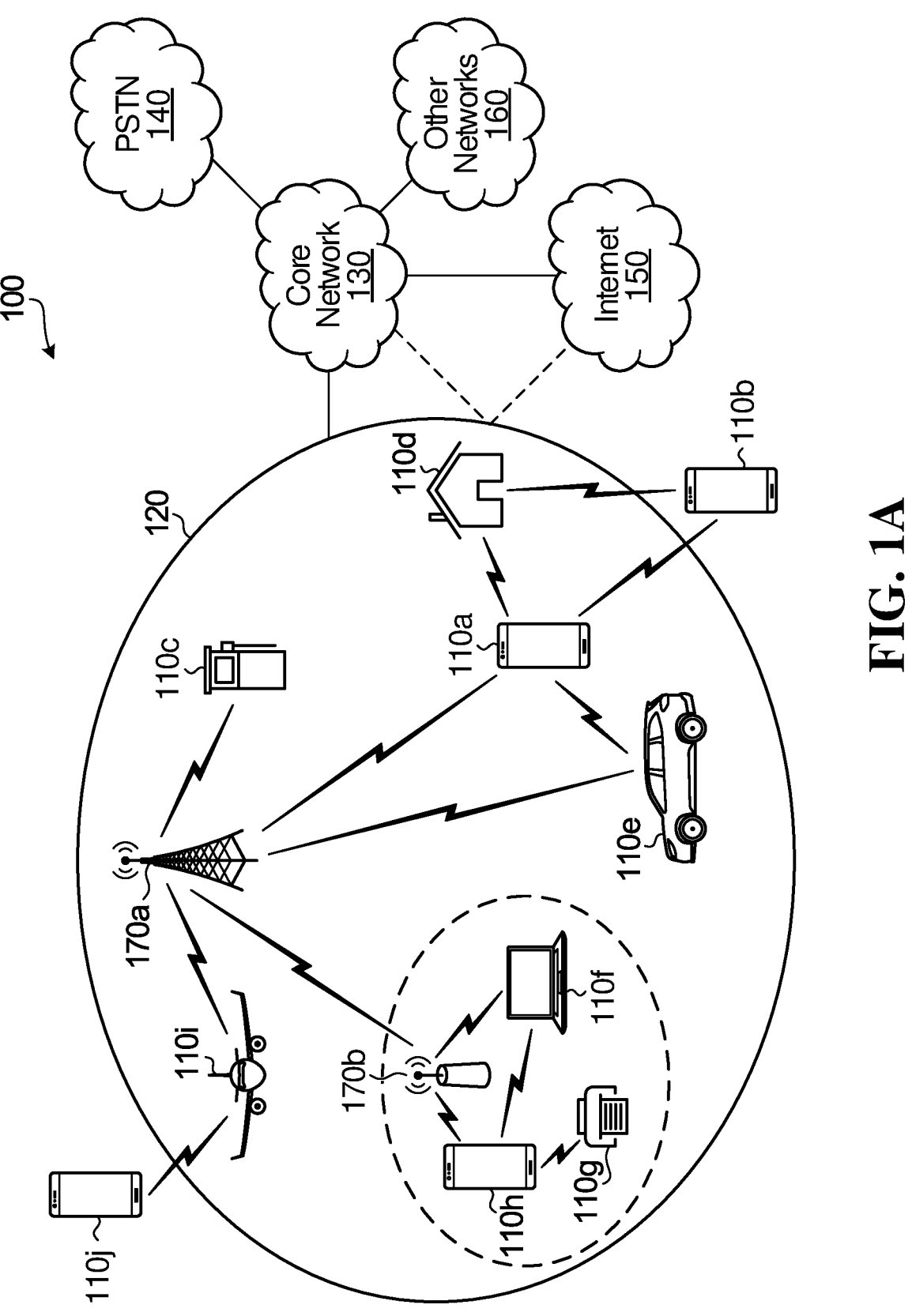
FIG. 1A is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the present disclosure may aid in addressing various issues associated with beam-based deployments.

One issue associated with beam-based deployments has to do with beam failure that may be experienced on common CORESETs (also referred to as CORESET #0) in multiple TRP transmission methods. Because CORESET #0 is typically a CORESET associated by default to a first TRP, when a UE being served by the TRP experiences beam failure on CORESET #0, the UE may not be able to monitor physical downlink control channel (PDCCH) carrying SI/Paging information transmitted from a second TRP. This may lead the UE to declare a radio link failure (RLF), which may trigger a connection re-establishment and result in a negative experience for a user of the UE.

Another issue associated with beam-based deployments has to do with neighbor cell system information acquisition in mobility management procedures. UEs can be configured to use SS/PBCH blocks or channel state information reference signals (CSI-RS) in order to perform mobility measurements. However, when using CSI-RSs, the UE may not monitor for PDCCH carrying SI/Paging information. The location of common CORESET is typically carried in the physical broadcast channel (PBCH), which is not transmitted jointly with CSI-RSs for mobility.

Aspects of the present disclosure provide a manner of associating a physical layer channel, such as, but not limited to, PBCH, PDCCH, and physical uplink control channel (PUCCH) and a receive beam assumption. The beam assumption may, for example, relate a receive beam direction with a reference signal transmitted by a BS in which the reference signal is used for any of multiple uses by the UE, such as beam management, multiple BS. including multiple terrestrial BS or TRPs and a combination of terrestrial BS and non-terrestrial BS, and UE mobility.

FIGS. 1A, 1B, 2A, and 2B following below provide context for the network and device that may be in the network and that may implement aspects of the present disclosure.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 1B:
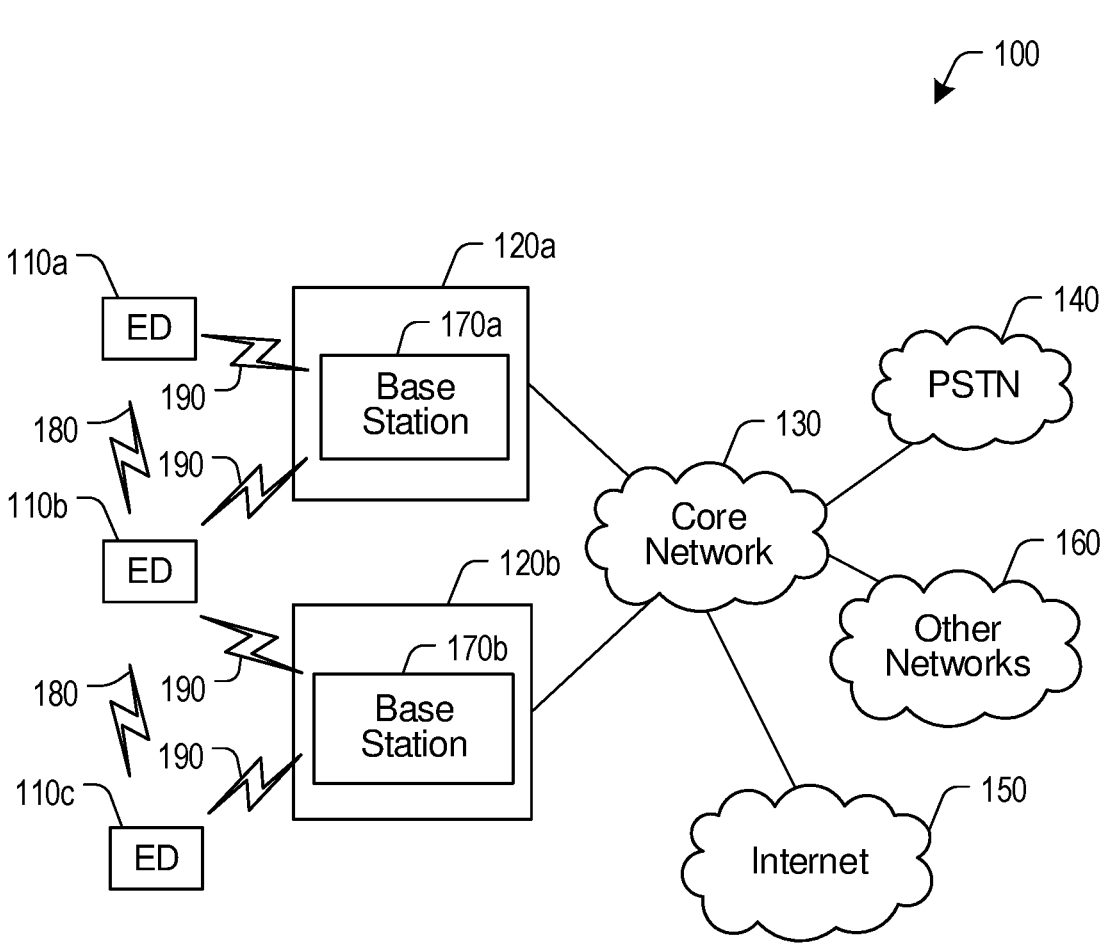
FIG. 1B is another schematic diagram of a communication system in which embodiments of the disclosure may occur.

FIG. 1B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1B, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1B, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1B, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170a-170b may be a terrestrial base station that is attached to the ground. For example, a terrestrial base station could be mounted on a building or tower. Alternatively, one or more of the base stations 170a-170b may be a non-terrestrial base station that is not attached to the ground. A flying base station is an example of the non-terrestrial base station. A flying base station may be implemented using communication equipment supported or carried by a flying device. Non-limiting examples of flying devices include airborne platforms, such as a blimp or an airship, balloons, and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the operation and/or embodiments described herein. In the embodiment shown in FIG. 1B, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 2A:
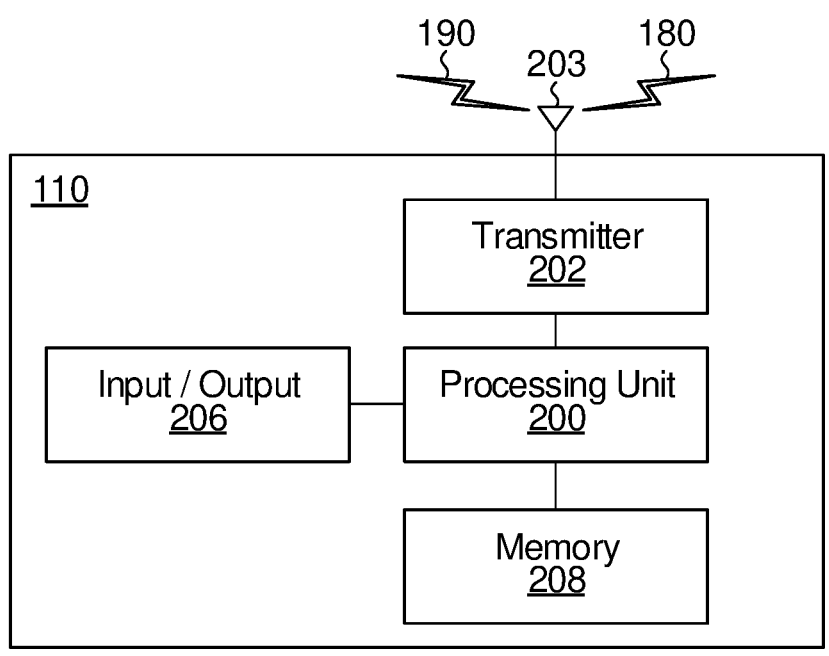
FIGS. 2A and 2B are block diagrams of an example user equipment (UE) and base station (BS).
Figure 2B:
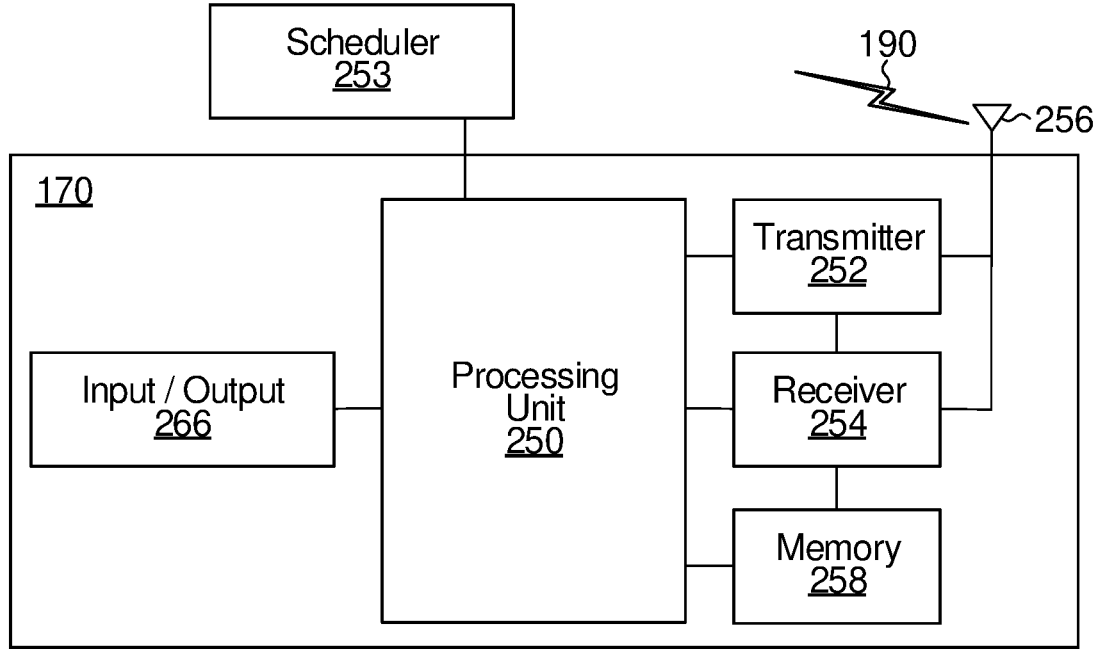

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory

208 could store software instructions or modules configured to implement some or all of the operations and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the operations and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the operations and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Embodiments of the present disclosure introduce using a grouping of parameters consisting of an identification of a physical layer channel and an associated receive beam assumption in a manner that the grouping can be used for a variety of purposes in a beam-based implementation, such as beam management, UE mobility and multiple BS scenarios.

A receive beam assumption may be configured by the network in which a UE operates. The network, via a BS serving the UE, provides to the UE configuration for a receive beam direction associated with a reference signal being transmitted to the UE. More generally, a beam assumption may correspond to a certain region of space that the UE can be configured to transmit a beam to, when the UE is transmitting to the network via a serving BS, or receive a beam from, when the UE is receiving from the network. The region of space may be indicated to the UE in the form of an azimuth angle, zenith angle, or a combination thereof. The UE can further refine or fine-tune the direction identified by the region of space configuration information using spatial filtering methods.

According to the manner in which the receive beam assumption is associated with a physical layer channel, for each receive beam assumption, the UE can be configured to receive, or transmit, on a physical layer channel, such as, but not limited to, physical broadcast channel (PBCH), physical downlink control channel (PDCCH), and physical uplink control channel (PUCCH). In some embodiments, an identification of a physical layer channel and an associated receive beam assumption can be configured by the network for the UE using different carriers or frequency bands. Configuring different groupings of an identification of a physical layer channel and an associated receive beam assumption may provide a more robust communication link, and allow for the network to better manage its physical layer resources to deliver a smoother user experience, in a variety of scenarios.

It is assumed that such grouping of receive beam assumption associated with a physical layer channel is shown in embodiments below using reference signals and physical layer channels occupying physical layer resources that are part of the same time-frequency resource unit. This resource unit is defined based on a reference time-unit, where a time-unit is defined as a reference duration in the time domain. Examples of time-units can be durations described in seconds, milli-seconds, micro-seconds, nano-seconds, orthogonal frequency division multiplexing (OFDM) symbols, mini-slots, slots, and subframes. Similarly, physical layer resources can be defined as part of the same frequency resource-unit, where a frequency unit is defined as a reference frequency bandwidth in the frequency domain. Examples of frequency-units can be descried in terms of Hertz (Hz), kilohertz (kHz), Megahertz (MHz), Gigahertz (GHz), Terahertz (THz), subcarriers, frequency resource blocks, sub-bands, narrow-bands and bandwidth parts. In embodiments shown herein, the physical layer resources occupied by the reference signal and the physical layer channel may be adjacent time-frequency resources. In some embodiments, the physical layer resources occupied by the reference signal and the physical layer resources occupied by the physical layer channel may not be in adjacent time-frequency resources. In some embodiments, the reference signal and the physical layer channel identified in the grouping of physical layer channel and associated receive beam assumption do not occupy physical layer resources in the same time-unit. For instance, the reference signal and the physical layer channel may have different time periodicities.

Because the reference signal and the physical layer channel are part of the same grouping of identification of a physical layer channel and associated receive beam assumption, the UE may use the same receive beam assumption to detect and measure the downlink reference signal and to detect, demodulate and decode the physical layer downlink channel.

The same reasoning can be applied to a transmit beam assumption, using the principle of beam correspondence, and the task of detecting and measuring the downlink reference signal and the task of transmitting, modulating and encoding the physical layer uplink channel.

Figure 3:
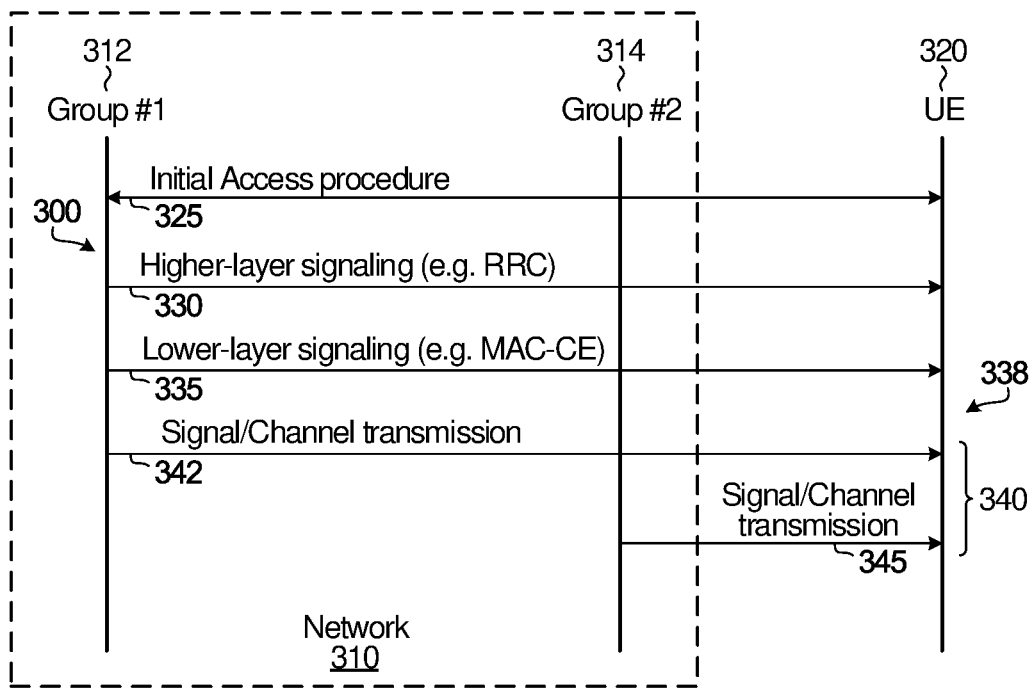
FIG. 3 is a signal flow diagram illustrating signaling between a UE and a network to configure multiple groups of associated physical layer channel and beam assumption and then activating a subset of the configured groups for particular uses, such as beam management, multiple BS and UE mobility, according to an aspect of the application.

In each of the following embodiments, groups of parameters can be configured as a set of one or more receive beam assumptions associated with one physical layer channel. FIG. 3 illustrates an example of a signal flow diagram 300 describing messaging between the network 310 and the UE 320.

FIG. 3 shows signaling for two groups, or groupings, of parameters consisting of an identification of a physical layer channel and an associated receive beam assumption, Group #1 and Group #2. The UE 320 performs 325 initial access (IA) with the network gets synchronized with the network and connects to the network using a physical layer channel and an associated receive beam assumption corresponding to the parameters defined in Group #1. The network transmits 330 configuration information on higher layer signaling, such as, for example radio resource control (RRC) signaling, to the UE that includes associations of physical layer channels and receive beam assumptions. The network transmits 335 configuration information on lower layer signaling, such as, for example media access control-control element (MAC-CE) signaling, the configuration information including an identification of an active set of one or more of the groups of associations to be actively used by the UE until the UE receives further lower layer signaling (i.e. MAC-CE commands) that the groups are not to be considered to be actively used, or a time of use of the groups expires. In this particular example, the network has indicated to the UE that active groups are Group #1 and Group #2. The UE is configured 338 and monitors 340 for signaling from the network on a physical layer channel and in a direction associated with the beam direction of Group #1 or on a physical layer channel and in a direction associated a beam direction of Group #2. While monitoring 340, the UE detects signaling 342 that corresponds to a physical layer channel identified in Group #1 from a direction associated with the beam direction identified in Group #1 and signaling 345 that corresponds to a physical layer channel identified in Group #1 from a direction associated with the beam direction identified in Group #2.

As indicated above, the groupings of an identification of a physical layer channel and an associated receive beam assumption may be used for beam management, UE mobility and multiple BS scenarios. FIG. 3 could apply to configuring and using groupings for any of these options or configuring and using groupings for combinations of these options. For example, the network may configure multiple sets of groupings substantially at the same time for each of beam management, UE mobility and multiple BS scenarios, and then activate a subset of the grouping for use by the UE.

In some embodiments, the grouping of a physical layer channel and an associated receive beam assumption by the network may be used by the UE for mobility purposes.

Figure 4:
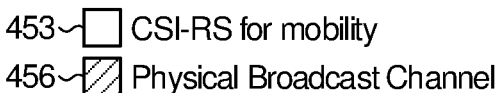
FIG. 4 is a block diagram of a portion of a network including a UE and multiple BSs that may use methods pertaining to UE mobility according to embodiments of the present disclosure.
Figure 4:
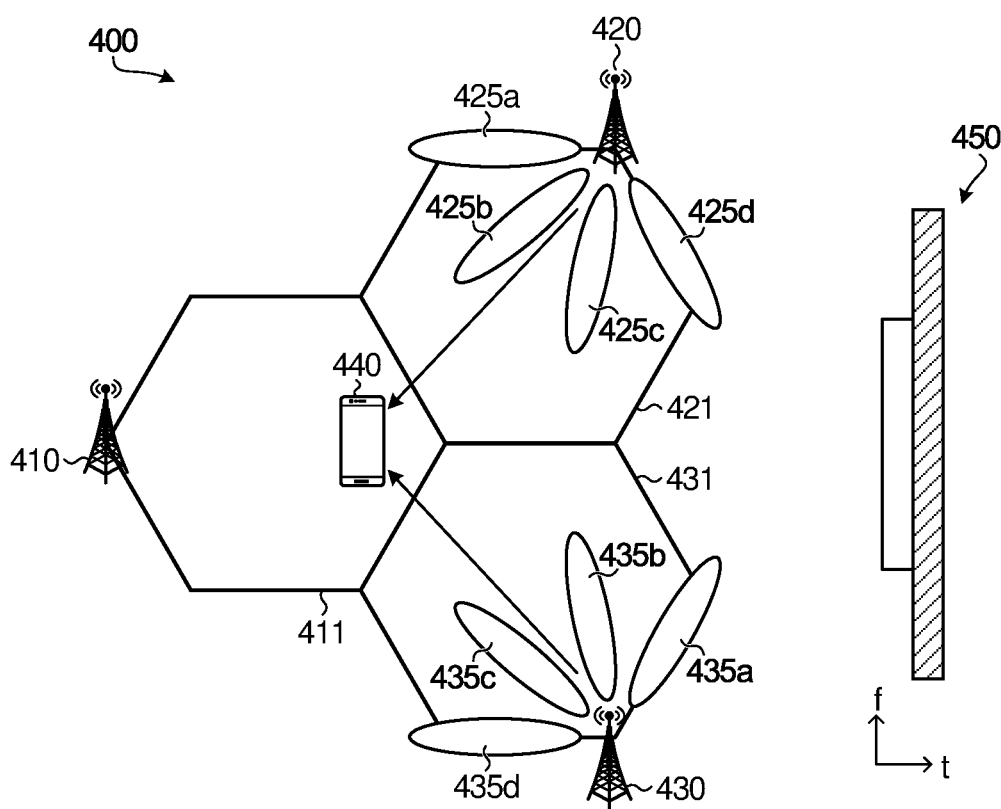

FIG. 4 illustrates an example a portion of a network 400 in which a UE 440 near an edge of a first cell 411 served by a first BS 410 may be handed off to a second BS 420 serving a second cell 421 or a third BS 430 serving a third cell 431. Sometime after the UE 440 performs IA and is synchronized with the network 400 via the BS 410, the BS 410 transmits higher layer configuration information that includes one or more groups of a physical layer channel and an associated receive beam assumption. The BS 410 then transmits lower layer configuration information that identifies one or more active groups of a physical layer channel and an associated receive beam assumption selected from the groups identified by the higher layer signaling, where the receive beam assumptions are associated with CSI-RSs for mobility. CSI-RSs for mobility are the particular references referred to herein for the most part, however, it should be considered that other reference signals could be used, for example reference signals that are expressly dedicated for this purpose.

In FIG. 4, BS 420 is shown transmitting four CSI-RSs that are used for enabling the functionality of UE mobility in the network on beams 425a, 425b, 425c and 425d and BS 430 is shown transmitting four CSI-RSs that are used for enabling the functionality of UE mobility in the network on beams 435a, 435b, 435c and 435d. Each CSI-RS corresponds to a certain receive beam assumption, which may include for example, a particular direction that the CSI-RS may be received from.

FIG. 4 also shows a portion of a time-frequency resource 450. The portion of the time-frequency resource 450 is shown on a 2 dimensional plane in which the horizonal axis is time and the vertical axis is frequency. The neighbor BSs 420 and 430 transmit the CSI-RSs for mobility, indicated by reference character 453 on a common frequency band of time-frequency band 450 followed by a PBCH 456, on the same beams, in the portion of the time-frequency resource 450.

Depending on the location of the UE 440, the network may identify neighbor BSs of interest to the UE 440 so that the UE 440 can pre-emptively decode the PBCH of the neighbor BSs as part of mobility processing. This may allow the UE 440 to retrieve system information included in the master information block (MIB), system information such as, but not limited to, the system frame number (SFN), the common CORESET (CORESET #0), and the common Search Space. By knowing such system information in advance, the network can ensure that the UE has a mobility experience with few disruptions as it moves within the coverage area of different BSs. By allowing functions such as paging and system information reception to be performed at the UE, the mobility experience of the UE can be improved by reducing potential interruptions.

Figure 5:
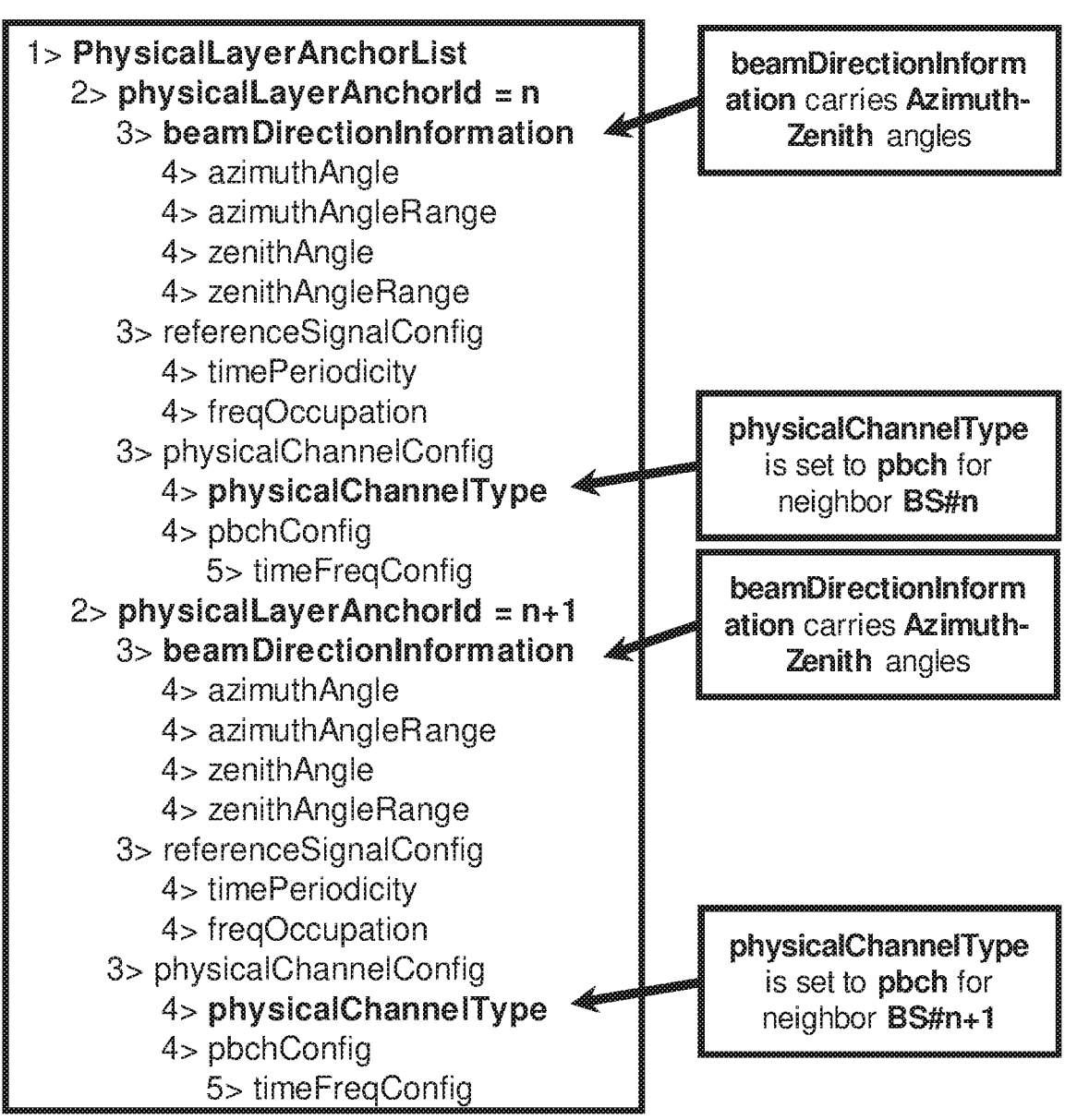
FIG. 5 is a representation of configuration information for use in defining groups of associated physical layer channel and beam assumption used in inter-cell mobility according to an aspect of the present disclosure.

FIG. 5 is an example of a representation of configuration information that may be provided in higher layer configuration to identify a group of a physical layer channel and an associated receive beam assumption to enable the UE to configure itself as part of UE mobility processing. The hierarchy shown in FIG. 5, and the subsequent figures with similar labelling, of Levels 1, 2, 3, etc. is merely to facilitate an understanding of information included in the configuration message, and it is to be understood that there may not be explicit level labelling included with this parameter information.

For each of the groupings of a physical layer channel and an associated receive beam assumption, which may for example correspond to Group #1 and Group #2 in FIG. 3, the groupings are identified in terms of the physical layer channel (for example the PBCH in FIG. 4) and an associated receive beam assumption (for example beam direction information for the CSI-RS for mobility). The receive beam assumption is expressed using parameters that indicate the region of space where the UE is configured to steer the UE receive beam. Additionally the beam direction can be accompanied with higher layer configuration information about reference signals.

In FIG. 5, Level 1 is a naming convention for a plurality of groups of configuration information (for example "PhysicalLayerAnchorList"). The term "anchor" is used here to be synonymous with the grouping of the physical layer channel and the associated receive beam assumption and therefore subsequent use of the term should be considered as being used interchangeably with the concept of the grouping of a physical layer channel and an associated receive beam assumption. Level 2 is a naming convention for an individual group (for example using "physicalLayerAnchorID=n"). Level 3 is a naming convention for beam direction information and physical channel configuration information (for example "beam Directioninformation" and "physicalChannelConfig"). Levels 4 and 5 define various parameters for the beam direction information and physical channel configuration information.

For the first grouping, physicalLayerAnchorID=n, beam direction information includes configuration information to define a beam direction azimuth angle ("azimuthAngle"), a beam direction azimuth angle range ("azimuthAngleRange"), a beam direction zenith angle ("zenithAngle"), and a beam direction zenith angle range ("zenithAngleRange"). Beam direction angle ranges are used by the network to indicate to the UE the beam width that is covered for a beam direction angle, along with its granularity in degrees. This allows the network to perform further fine-tuning of the beam direction indication at the UE side, based on for example, UE movement, network node movement, or changing radio conditions. These beam direction angles indicate to the UE where to steer a UE receive beam in order to detect, demodulate and decode the physical layer channel that is part of the grouping of the physical layer channel and the associated receive beam assumption. These beam direction angles are also used by the UE to steer the UE receive beam in order to detect and measure the reference signal that is part of the grouping of the physical layer channel and the associated receive beam assumption. Additional configuration information about the first grouping includes reference signal configuration information ("referenceSignalConfig") that includes identifying a periodicity in time of a reference signal in a time-frequency resource ("timePeriodicity") and an occupation of frequency for the reference signal in the time-frequency resource information ("freqOccupation"). In addition to the time-frequency configuration, the network may also provide configuration information to the UE about a sequence generation, using parameters such as a sequence identifier, a type of the sequence (e.g. Gold sequences), and a length of the sequence in number of bits.

Also for the first grouping, physicalLayerAnchorID=n, the configuration information includes physical channel configuration information that identifies a physical layer channel type ("physicalChannelType"). In the case of FIG. 5, the physical channel type is PBCH. This allows the UE to know that any corresponding beam assumption is tied with that PBCH, allowing the UE to locate the common CORESET and monitor PDCCH for the BS associated with the PBCH, which may be carrying SI/Paging information. The configuration also includes physical layer channel configuration information ("pbchConfig") for the physical layer channel type includes time and frequency configuration information ("timeFreqConfig"), i.e. the location in the time-frequency resource.

Time and frequency configuration information for the PBCH may include various information. In a particular example of a time-unit, where a slot is defined as a time-frequency resource block with 14 OFDM symbols and 12 subcarriers, the PBCH time and frequency configuration information may include slot periodicity, which indicates how often the PBCH is transmitted and is expressed in number of slots. The PBCH time and frequency configuration information may also include identifying time-frequency resources occupied by the PBCH, thus providing the UE with an exact resource mapping of the PBCH on the time-frequency resource grid. The PBCH time and frequency configuration information may also include identifying a modulation type used to map the PBCH bits to complex-valued OFDM symbols. Examples of modulation types include, but are not limited to, binary phase shift keying (BPSK), quadrature phase shift keying QPSK, 16 level quadrature amplitude modulation (16-QAM), and 64-QAM. The PBCH time and frequency configuration information may also include identifying channel-coding used to encode the PBCH bitstream. Examples of channel-coding information include, but are not limited to, a type of channel-coding such as Turbo-coding, convolutional coding, Low-Density Parity Check coding, and Polar coding, and the length of a PBCH bitstream expressed in number of bits. The PBCH time and frequency configuration information may also include transmit power configuration and an initial scrambling identity used to scramble the PBCH bitstream.

Configuration information for a second grouping ("physicalLayerAnchorID=n") is also included in FIG. 5 including the same configuration information as the first grouping. The network can send similar information for multiple groups.

The configuration information in FIG. 5 is transmitted in the high layer signaling. Once the UE is provided with the configuration information for each of the groups that the network provides the UE, the network can send a simple identifier, for example the physicalLayerAnchorID to identify the active groups in the MAC-CE command. This activation of groups can be done using dedicated MAC-CE commands used to indicate to the UE which groupings of physical layer channel and associated receive beam assumption are to be actively detected, demodulated and decoded by the UE at a given time. Such activation of groupings of physical layer channel and associated receive beam assumption allows the network to target network nodes that are determined to be of interest to the UE for the function of UE mobility, reducing the need for the UE to detect and measure reference signals from network nodes that are not of interest for the function of UE mobility.

If the UE is configured by the network with one or more groupings of physical layer channel and associated receive beam assumption for the function of UE mobility, then the UE may detect and measure the reference signal associated with each respective groupings. Otherwise, if the UE is not configured by the network with any groupings of physical layer channel and associated receive beam assumption for the function of UE mobility, then the UE is not expected to detect and measure any reference signals for the function of UE mobility.

In some embodiments, if the UE is configured by the network with one or more groupings of physical layer channel and associated receive beam assumption for the function of UE mobility, then the UE may detect and measure the reference signal associated with each respective grouping. In some embodiments, the UE may also attempt to detect, demodulate and decode the PBCH channel if the UE successfully detects the reference signal associated with the grouping. In some embodiments, the UE may attempt to detect, demodulate and decode the PBCH channel, irrespective of whether the UE successfully detects the reference signal associated with the grouping or not.

In some embodiments, if the UE is configured by the network with one or more groupings of physical layer channel and associated receive beam assumption for the function of UE mobility, wherein the one or more groupings use different time periodicities for the reference signal and the PBCH, then the UE may use the largest configured time periodicity when attempting to detect and measure the reference signal and attempting to detect, demodulate and decode the PBCH channel.

In some embodiments, if the UE is configured by the network with one or more groupings of physical layer channel and associated receive beam assumption for the function of UE mobility, wherein the one or more groupings use different time periodicities for the reference signal and the PBCH, then the UE is expected to use the smallest configured time periodicity when attempting to detect and measure the reference signal and attempting to detect, demodulate and decode the PBCH channel.

In some embodiments, if the UE is configured by the network with one or more groupings of physical layer channel and associated receive beam assumption for the function of UE mobility, wherein the one or more groupings use different time periodicities for the reference signal and the PBCH, then the UE may not attempt to detect and measure the reference signal in time-units where the reference signal and the PBCH are not transmitted together. Similarly, the UE may not be expected to attempt to detect, demodulate and decode the PBCH in time-units where the reference signal and the PBCH are not transmitted together.

In some embodiments, if the UE is configured by the network with one or more groupings of physical layer channel and associated receive beam assumption for the function of UE mobility, then the UE may steer the UE receive beam towards the region of space indicated by the angles "azimuthAngle" and "zenithAngle" within a certain time interval of receiving the MAC-CE command activating the corresponding grouping. The time interval may be indicated in a given time-unit, such as a number of slots, mini-slots, groups of OFDM symbols, or OFDM symbols.

This embodiment may be applicable to scenarios where the UE is moving between different base stations and needs to be informed about the mobility beams that the UE is supposed to detect, measure and report on from the different base stations. The use of higher layer based, such as Layer 3 (L3)-based, configuration is fully flexible, but such configuration is time-consuming in its nature. In contrast, lower layer based, Layer 1/Layer 2 (L1/L2)-based, reconfiguration is compressed, in some situation having less flexibility, but such configuration is faster in implementation. Such compressed reconfiguration by L1/L2 signaling allows the network to select one group of configuration information parameters from among a pre-defined set of such groups of configuration information parameters. In some embodiments, the groups of configuration information parameters are maintained in a tabulated form. Using such a compressed reconfiguration process allows the network to update specific aspects of reference signal configuration relevant for detection and measurement purposes, while limiting the set of usable values to specific values of interest.

Using grouping of a physical layer channel and an associated receive beam assumption by the network for mobility purposes may provide a smooth mobility experience as the UE can be transferred from one BS to another seamlessly. Also, in some embodiments in which the network controls mobility measurements, the network controls which neighbor BSs the UE monitors system information for, enabling smooth mobility experiences.

In some embodiments, the grouping of a physical layer channel and an associated receive beam assumption by the network may be used by the UE for multi-BS transmission purposes or inter-BS transmission purposes. In the context of this embodiment, TRPs are assumed to be fully-fledged BSs (i.e. that they run all of the functions related to the packet data convergence protocol (PDCP), radio link control (RLC), media access control (MAC) and physical layers), however other embodiments can be envisaged where TRPs may simply be network nodes that are connected to the same BS via some wireline or wireless backhaul link (i.e. that the TRPs only run the functions related to the MAC and physical layers) as part of a centralized network topology. In such embodiments, the UE would be configured for intra-BS multi-TRP transmission purposes.

Figure 6:
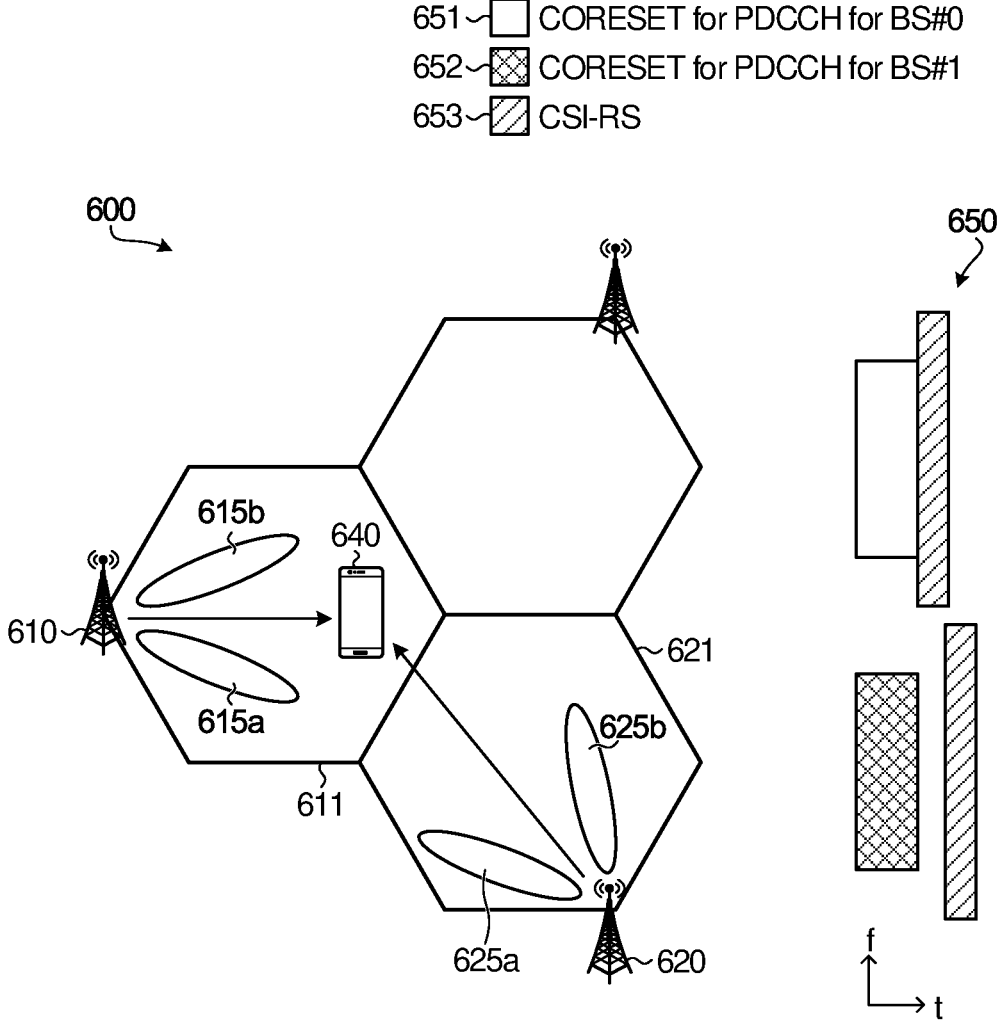
FIG. 6 is a block diagram of a portion of a network including a UE and multiple BSs that may use methods pertaining to multiple BSs according to embodiments of the present disclosure.

FIG. 6 illustrates an example a portion of a network 600 in which a UE 640 near an edge of a first cell 611 served by both a first BS 610 and a second BS 620 that is serving a second cell 621. Sometime after the UE 640 performs IA and is synchronized with the network 600 via the BS 610, the BS 610 transmits higher layer configuration information that includes one or more groups of a physical layer channel and an associated receive beam assumption. The BS 610 then transmits lower layer configuration information that identifies one or more active groups of a physical layer channel and an associated receive beam assumption selected from the groups identified by the higher layer signaling, where the receive beam assumptions are associated with reference signals for multi-BS transmission purposes or inter-BS transmission purposes. CSI-RSs are the particular references referred to herein for the most part, however, it should be considered that other reference signals could be used, for example demodulation reference signals (DMRS) or other reference signals that are expressly dedicated for this purpose.

In FIG. 6, the two BSs 610 and 620 are depicted as each transmitting 2 CSI-RSs on beams (615a and 615b for BS 610 and 625a and 625b for BS 620) for multi-BS transmission purposes. Each CSI-RS corresponds to a certain receive beam assumption. BS 610 and BS 620 transmit different CORESETs allowing the UE 640 to monitor PDCCH transmissions from the two BSs 610 and 620 using the associated receive beam assumptions on a portion of a time-frequency resource 650.

FIG. 6 also shows a portion of a time-frequency resource 650. The portion of the time-frequency resource 650 is shown on a 2 dimensional plane in which the horizontal axis is time and the vertical axis is frequency. The CORESET 651 is transmitted on PDCCH for BS 610 in a first frequency band of time-frequency resource 650 followed by the CSI-RS 653 for BS 610 on each beam 615a and 615b and the CORESET 652 is transmitted on PDCCH for BS 620 in a second frequency band time-frequency resource 650 followed by the CSI-RS 653 for BS 620 on each beam 625a and 625b.

Depending on the location of the UE 640, the network can send group configuration information to the UE 640 to configure the UE 640 for multi-BS transmissions using BSs of interest so that the UE 640 can decode PDCCH transmissions scheduling physical downlink shared channel (PDSCH) transmissions. Examples of PDSCH transmissions may include SI/Paging information or UE-specific data.

Figure 7:
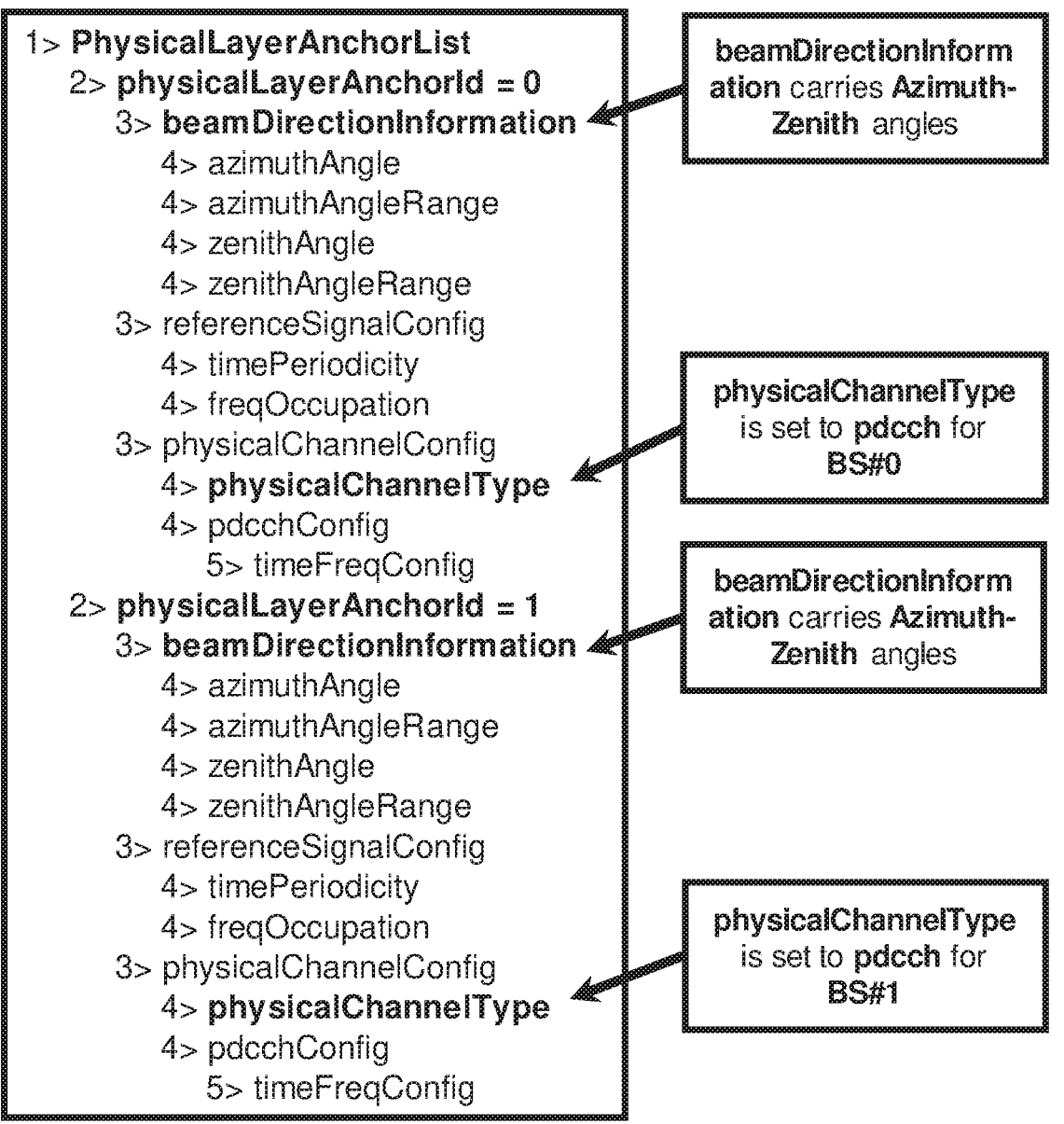
FIG. 7 is a representation of configuration information for use in defining groups of associated physical layer channel and beam assumption used in multiple BS processes according to an aspect of the present disclosure.

FIG. 7 is an example of a representation of configuration information that may be provided in higher layer configuration to identify a group of a physical layer channel and an associated receive beam assumption to enable the UE to configure itself as part of multi-BS processing.

FIG. 7 has a similar hierarchical structure to FIG. 5. For each of the groupings of a physical layer channel and an associated receive beam assumption that are included in the configuration in FIG. 7, the groups are identified in terms of the physical layer channel (for example the PDCCH in FIG. 6) and an associated receive beam assumption (for example beam direction information for the CSI-RS for multi-BS). The groupings are of the type that are shown to be configured and used in FIG. 3, i.e. Group #1 and Group #2. The receive beam assumption is configured using parameters that indicate a region of space where the UE is being configured to steer the UE receive beam. Additionally the beam direction can be accompanied with higher layer configuration information about reference signals.

In FIG. 7, for the first group, physicalLayerAnchorID=0, beam direction information includes configuration information to define a beam direction azimuth angle ("azimuth-Angle"), a beam direction azimuth angle range ("azimuth-AngleRange"), a beam direction zenith angle ("zenithAngle"), and a beam direction zenith angle range ("zenithAngleRange"). Beam direction angle ranges are used by the network to indicate to the UE the beam width that is covered for a beam direction angle, along with a granularity in degrees. This allows the network to perform further fine-tuning of the beam direction indication at the UE side, based on UE movement, network node movement or changing radio conditions. Additional configuration information about the first group includes reference signal configuration information ("referenceSignalConfig") that includes identifying a periodicity in time of a reference signal in a time-frequency resource ("timePeriodicity") and an occupation of frequency for the reference signal in the time-frequency resource information ("freqOccupation"). In addition to the time-frequency configuration, the network may also provide configuration information to the UE about a sequence generation, using parameters such as a sequence identifier, a type of the sequence (e.g. Gold sequences), and a length of the sequence in number of bits.

Also for the first grouping, physicalLayerAnchorID=0, beam direction information includes configuration information to define physical channel configuration information including identification of a physical layer channel type ("physicalChannelType"). In the case of FIG. 7, the physical channel type is PDCCH. This allows the UE to know that any corresponding beam assumption is tied with a PDCCH for a particular BS, allowing the UE to locate the common CORESET and monitor PDCCH carrying SI/Paging information. The configuration also includes physical layer channel configuration information ("pdcchConfig") for the physical layer channel type includes time and frequency configuration information ("timeFreqConfig") i.e. the location in the time-frequency resource.

Time and frequency configuration information for the PDCCH channel may include various information. PDCCH messages are assumed to be received by the UE in a CORESET, which corresponds to a time-frequency region. In a particular example of a time-unit, where a slot is defined as a time-frequency resource block with 14 OFDM symbols and 12 subcarriers, the CORESET configuration may include a slot periodicity, which indicates how often the UE should monitor for PDCCH transmissions on the CORESET expressed in a number of slots. The CORESET configuration may also include the time-frequency resources occupied by the CORESET, thus providing the UE with an exact resource mapping of the CORESET on the time-frequency resource grid.

The PDCCH configuration information may also include corresponding search space configuration information, wherein each search space defines a particular region of the CORESET where the UE monitors for a given PDCCH transmission. Search space configuration information may include further information such as a number of search spaces, a time-frequency resources occupied by each search space, types of control messages (i.e. downlink assignments) that the UE may monitor on a given search space, a channel-coding information used to encode the downlink assignments. Examples of channel-coding information include, but are not limited to, a type of channel-coding such as Turbo-coding, convolutional coding, Low-Density Parity Check coding, and Polar coding, and a length of the control messages expressed in number of bits.

In the context of embodiments for multi-BS transmission purposes, the reference signals on the physical layer channels from the multiple BSs associated with the groupings of the receive beam assumption and the physical layer channel may occupy the same time-frequency resource block, assuming that time-frequency resource blocks are allocated on some common granularity in the time-frequency grid, e.g. OFDM symbols in the time domain and subcarriers in the frequency domain. As a particular, non-limiting example, a UE receives PDCCHs from two different BSs in every slot. Each of the PDCCHs are received using a particular UE receive beam. The CSI-RSs associated with the respective PDCCH and UE receive beam (identified in two respective groupings 2) have a periodicity of 10 slots. So there is only one slot in each set of ten slots where the PDCCH and CSI-RS are present together in the same slot, whereas in the other nine slots, there is no CSI-RS present. However, the network still transmits two PDCCHs to the UE via the respective BS. Any time the UE detects and decodes a PDCCH, the UE uses the UE receive beam configured as part of the grouping, even if the CSI-RS is not there because the CSI-RSs periodicity is every 10 slots.

The reference signal associated with the receive beam assumption and the physical layer channel might not be transmitted together at all times. For example, the reference signal may be a periodic reference signal transmitted with a certain periodicity, e.g. in number of slots, whereas the PDCCH is transmitted in every slot.

In some embodiments, if the UE is configured by the network with one or more groupings of physical layer channel and associated receive beam assumption for the function of multi-TRP transmission, then the UE may detect and measure the reference signal associated with each respective grouping. Otherwise, if the UE is not configured by the network with any grouping for the function of multi-TRP transmission, then the UE is not expected to detect and measure any reference signals for the function of multi-TRP transmission. In some embodiments, the UE may attempt to detect, demodulate and decode the PDCCH channel if the UE successfully detects the reference signal associated with the grouping.

In some embodiments, the UE may also attempt to detect, demodulate and decode the PDCCH channel, irrespective of whether the UE successfully detected the reference signal associated with the grouping or not.

In some embodiments, if the UE is configured by the network with one or more groupings of physical layer channel and associated receive beam assumption for the function of multi-BS transmission and the one or more groupings configured by the network are provided with a "pdschConfig" parameter, then the UE may detect, demodulate and decode PDSCH transmissions scheduled by PDCCH transmissions received on a physical layer channel identified in an active grouping. The PDSCH transmissions are decoded by the UE using the parameters provided in "pdschConfig". Parameters provided in "pdschConfig" may include any one or more of the following non-exhaustive list: sequence generation initializing values, rate-matching parameters, time-frequency resource configuration parameters, total number of HARQ processes, modulation and coding scheme tables.

In some embodiments, if the UE is configured by the network with one or more groupings of physical layer channel and associated receive beam assumption for the function of multi-BS transmission, then the UE may steer the UE receive beam towards the region of space indicated by the angles "azimuthAngle" and "zenithAngle" within a certain time interval of receiving the MAC-CE command activating the corresponding grouping. The time interval can be indicated in a given time-unit, such as a number of slots, mini-slots, groups of OFDM symbols, or OFDM symbols.

Configuration information for a second grouping ("physicalLayerAnchorID=1") is also included in FIG. 7 including all the same configuration information as the first grouping. The network can send similar information for multiple groups.

The configuration information in FIG. 7 is transmitted in the high layer signaling. Once the UE is provided with the configuration information for each of the groups that the network provides the UE, the network can send a simple identifier, for example the physicalLayerAnchorID to identify the active groups in the MAC-CE command. This activation of groups can be done using dedicated MAC-CE commands used to indicate to the UE which groupings of physical layer channel and associated receive beam assumption are to be actively detected, demodulated and decoded by the UE at a given time.

Using grouping of a physical layer channel and an associated receive beam assumption by the network for multi-BS purposes may provide reliable multi-BS transmission because the UE can maintain full connectivity with the network when beam-failure occurs on one of the physical layer channels of a grouping. For example, the UE may continue to receive control information and UE-specific data. Also, in some embodiments in which the network controls user experience, the network controls which BSs the UE listens to at any given time. Therefore, the UE does not necessarily waste time and processing power detecting and measuring radio links from BSs that the network determines as being not of interest to the UE.

In some embodiments, the grouping of a physical layer channel and an associated receive beam assumption by the network may be used by the UE for beam management purposes.

Figure 8:
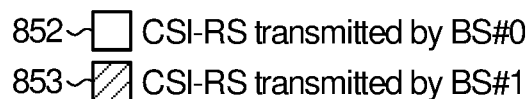
FIG. 8 is a block diagram of a portion of a network including a UE and multiple BSs that may use methods pertaining to beam management according to embodiments of the present disclosure.
Figure 8:
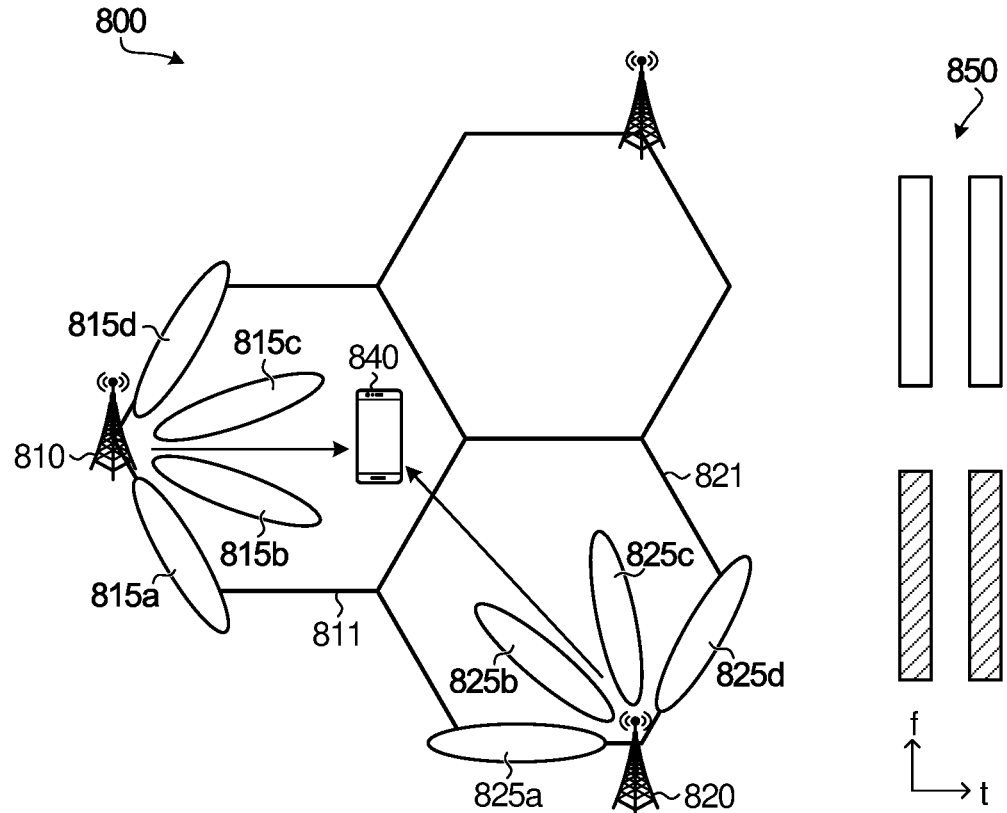

FIG. 8 illustrates an example a portion of a network 800 in which a UE 840 near an edge of a first cell 811 served by both a first BS 810 and a second BS 820, which is serving a second cell 821. Sometime after the UE 840 performs IA and is synchronized with the network 800 via the BS 810, the BS 810 transmits higher layer configuration information that includes one or more groups of a physical layer channel and an associated receive beam assumption. The BS 810 then transmits lower layer configuration information that identifies one or more active groups of a physical layer channel and an associated receive beam assumption selected from the groups identified by the higher layer signaling, where the receive beam assumptions are associated with reference signals for multi-BS transmission purposes or inter-BS transmission purposes. CSI-RSs are the particular references referred to herein for the most part, however, it should be considered that other reference signals could be used, for example demodulation reference signals (DMRS) or other reference signals that are expressly dedicated for this purpose.

In FIG. 8, the two BSs are illustrated as each transmitting four CSI-RSs on beams (815a, 815b, 815c, and 815d for BS 810 and for 825a, 825b, 825c, and 825d for BS 820) for beam management purposes. Each CSI-RS corresponds to a certain receive beam assumption, and BS 810 and BS 820 use different CSI-RSs transmitted on different time-frequency resources, allowing the UE to detect, measure and report on the quality of these beam assumptions.

FIG. 8 also shows a portion of a time-frequency resource 850. A portion of the time-frequency resource 850 is shown on a 2 dimensional plane in which the horizonal axis is time and the vertical axis is frequency. The CSI-RS 852 is transmitted on PUCCH by BS 810 at a first frequency location of the time-frequency resource 850 on each beam 815a, 815b, 815c, and 815d and the CSI-RS 853 is transmitted on PUCCH by BS 820 at a first frequency location of the time-frequency resource 850 on each beam 825a, 825b, 825c, and 825d.

Depending on the location of the UE, the network can send group configuration information to the UE to configure the UE for beam management using BSs of interest so that the UE can detect, measure and report on these group parameters over the associated PUCCH. Each grouping has its own PUCCH for reporting purposes, allowing the network to configure different measurement and reporting periodicities for each group. In some embodiments, the PUCCH is transmitted towards the individual BSs that transmit the CSI-RS for beam management purposes. When the transmit beam assumption and beam direction is assumed to be the same as the receive beam assumption and beam direction, there is beam correspondence. The transmit beam assumption and beam direction is then associated with a corresponding reference signal and a corresponding physical channel. Examples of a corresponding reference signal may include uplink sounding reference signal (UL SRS) and uplink positioning reference signal (UL PRS) and a corresponding physical channel may include the physical uplink control signal (PUCCH).

Figure 9:
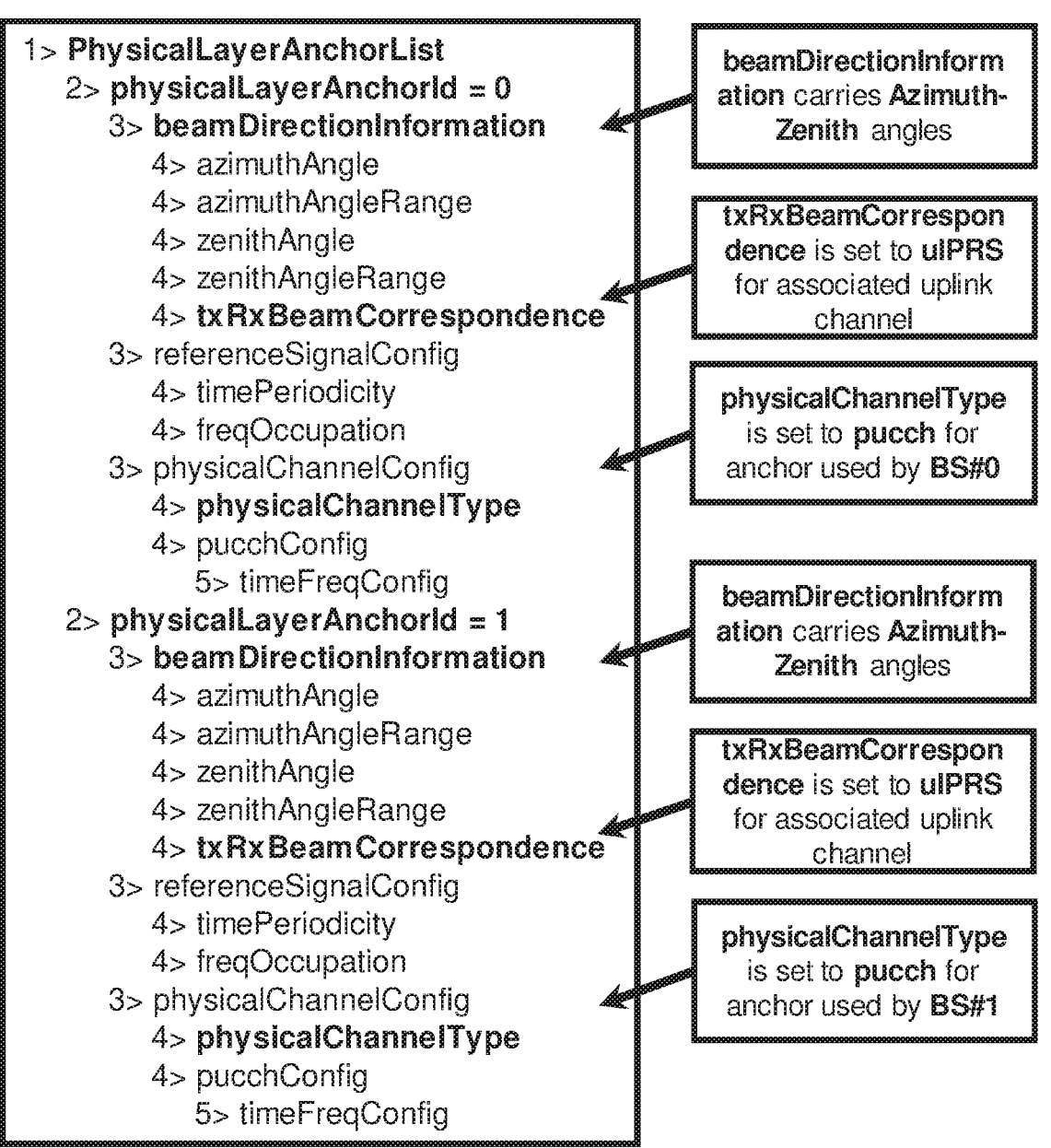
FIG. 9 is a representation of configuration information for use in defining groups of associated physical layer channel and beam assumption used in beam management processes according to an aspect of the present disclosure.

FIG. 9 is an example of a representation of configuration information that may be provided in higher layer configuration to identify a group of a physical layer channel and an associated receive beam assumption to enable the UE to configure itself as part of beam management processing.

FIG. 9 has a similar hierarchical structure to FIG. 5. For each of the groupings of a physical layer channel and an associated receive beam assumption that are included in the configuration in FIG. 9, the groups are identified in terms of the physical layer channel (for example the PUCCH in FIG. 8) and an associated receive beam assumption (for example beam direction information for the CSI-RS for beam management). The groupings are of the type that are shown to be configured and used in FIG. 3, i.e. Group #1 and Group #2. The receive beam assumption is configured using parameters that indicate the region of space where the UE is configured to steer the UE receive beam. Additionally, the beam direction can be accompanied with configuration information about reference signals. Furthermore, the beam direction can be accompanied with configuration information about beam correspondence, whose presence indicates beam correspondence between receive and transmit beam assumptions and whose configured values indicate an associated UL reference signal (e.g. UL PRS) for the physical channel configured as part of the grouping configuration.

In FIG. 9, for the first grouping, physicalLayerAnchorID=0, beam direction information includes configuration information to define a beam direction azimuth angle ("azimuthAngle"), a beam direction azimuth angle range ("azimuthAngleRange"), a beam direction zenith angle ("zenithAngle"), a beam direction zenith angle range ("zenithAngleRange") and transmit/receive beam correspondence information ("txRxBeamCorrespondence"). Beam direction angle ranges are used by the network to indicate to the UE the beam width that is covered for a beam direction angle, along with its granularity in degrees. This allows the network to perform further fine-tuning of the beam direction indication at the UE side, based on UE movement, network node movement, or changing radio conditions. Additional configuration information about the first group includes reference signal configuration information (referenceSignalConfig) that includes identifying a periodicity in time of a reference signal in a time-frequency resource ("timePeriodicity") and an occupation of frequency for the reference signal in the time-frequency resource information ("freqOccupation"). In addition to the time-frequency configuration, the network may also provide configuration to the UE about a sequence generation, using parameters such as a sequence identifier, a type of the sequence (e.g. Gold sequences), and a length of the sequence in number of bits.

Also for the first grouping, physicalLayerAnchorID=0, beam direction information includes configuration information to define physical channel configuration information including identification of a physical layer channel type ("physicalChannelType"). In the case of FIG. 9, the physical channel type is PUCCH. This allows the UE to know that any corresponding beam assumption is tied with the PUCCH for a given BS, allowing the UE to report beam measurements associated with that grouping. The configuration also includes physical layer channel configuration information ("pucchConfig") for the physical layer channel type includes time and frequency configuration information ("timeFreqConfig") i.e. the location in the time-frequency resource.

Time and frequency configuration information for the PUCCH channel may include various information. PUCCH messages are assumed to be transmitted by the UE in a PUCCH resource, which corresponds to a time-frequency region. In a particular example of a time-unit, where a slot is defined as a time-frequency resource block with 14 OFDM symbols and 12 subcarriers, the PUCCH configuration information may include an identification of the set of PUCCH time-frequency resources that can be used by the UE to transmit PUCCHs, thus providing the UE with an exact resource mapping of the PUCCH on the time-frequency resource grid.

In addition to the time-frequency resources occupied by the PUCCH transmission, in some embodiments, the PUCCH configuration information may include an identification of the PUCCH formats which the UE can use to transmit PUCCHs to the network, thus indicating a format of Uplink Control Information (UCI) to be transmitted in the PUCCH. The PUCCH configuration information may also include power control information indicating the transmit power to be used by the UE for PUCCH transmission. The PUCCH configuration information may also include information about the channel-coding to be used when encoding the UCI. Examples of channel-coding information include, but are not limited to, a type of channel-coding such as repetition coding, Simplex coding, Reed-Muller coding, Convolutional coding, and Polar coding. The PUCCH configuration information may also include information about a frequency hopping scheme to be used when the UE is transmitting PUCCHs.

The beam management CSI-RSs transmitted by BSs 810 and 820 are downlink reference signals, i.e. the BSs use a certain transmit spatial filter in order to transmit those reference signals and the UE uses a certain receive beam assumption in order to detect and measure them. It is assumed that there is a correspondence between the receive beam assumption the UE uses to receive the CSI-RSs 852 on beams 815a-815d and the CSI-RSs 853 beams 825a-825d and the transmit beam assumption the UE uses to transmit the PUCCHs with the beam management reports for those respective CSI-RSs 852 and 853.

In some other embodiments, if the UE is configured by the network with one or more groupings of physical layer channel and associated receive beam assumption for the function of beam management, then the UE may detect and measure the reference signal associated with each respective grouping. Otherwise, if the UE is not configured by the network with any grouping for the function of beam management, then the UE is not expected to detect and measure any reference signals for the function of Beam Management.

In some other embodiments, the UE may transmit a beam management report carrying measurement reports for the reference signals the UE attempts to detect and measure on the PUCCH channel associated with the respective grouping, if the UE successfully detects the reference signal associated with the grouping.

In some embodiments, if the UE is configured by the network with one or more groupings of physical layer channel and associated receive beam assumption for the function of beam management and at least one of the groupings is configured with a "pucchConfig" parameter and at least one of the grouping is configured with an "associatedReportingAnchor" parameter, then the UE may detect and measure the reference signal associated with each respective grouping. The "associatedReportingAnchor" parameter is provided by the network for groupings that are not provided with the "pucchConfig" parameter, wherein the "associatedReportingAnchor" parameter is set to the identity of a grouping provided with the "pucchConfig" parameter. In some embodiments, the UE may transmit a beam management report carrying measurement reports for the reference signals the UE attempts to detect and measure on the PUCCH channel of the grouping indicated by the "associatedReportingAnchor", if the UE successfully detects the reference signal associated with the grouping. This allows the UE to send beam management reports for one or more groupings of physical layer channel and associated receive beam assumption over the PUCCH of one grouping.

In some embodiments, if the UE is configured by the network with one or more groupings of physical layer channel and associated receive beam assumption for the function of beam management and one or more of the groupings is configured with a "pucchConfig" parameter and a "pucchReportConfig" parameter, then the UE may detect and measure the reference signal associated with each respective grouping provided with "pucchConfig" and "pucchReportConfig" parameters. The "pucchReportConfig" parameter may be provided by the network in order to indicate the reporting format of the beam management reports. The beam management reports may include information such as reporting periodicity and a metric of the report, for example Layer 1 reference signal received power (L1-RSRP), filtered L1-RSRP, Layer 1 signal to noise and interference ratio (L1-SINR), and filtered L1-SINR. In some embodiments, the UE may transmit a beam management report carrying measurement reports as per the configuration provided in "pucchReportConfig" for the reference signals the UE attempts to detect and measure on the PUCCH channel associated with the grouping, if the UE successfully detects the reference signal associated with the grouping.

In some embodiments, if the UE is configured by the network with one or more groupings of physical layer channel and associated receive beam assumption for the function of beam management, each grouping may additionally be configured with a set of physical layer reference signals instead of a single physical layer reference signal. Each reference signal in the set may have different time-frequency resources configured and each reference signal may be detected and measured by the UE using the same receive beam assumption.

In some embodiments, if the UE is configured by the network with one or more groupings of physical layer channel and associated receive beam assumption for the function of beam management, then the UE may steer the UE receive beam towards the region of space indicated by the angles "azimuthAngle" and "zenithAngle" within a certain time interval of receiving the MAC-CE command activating the corresponding grouping. The time interval can be indicated in a given time-unit, such as a number of slots, mini-slots, groups of OFDM symbols, and individual OFDM symbols.

Configuration information for a second grouping ("physicalLayerAnchorID=1") is also included in FIG. 9 including all the same configuration information as the first grouping. The network can send similar information for multiple groups.

The configuration information in FIG. 9 is transmitted in the high layer signaling. Once the UE is provided with the configuration information for each of the groups that the network provides the UE, the network can send a simple identifier, for example the physicalLayerAnchorID to identify the active groups in the MAC-CE.

Using grouping of a physical layer channel and an associated receive beam assumption by the network for multi-BS purposes may provide a smooth transition between beams because UEs can be transferred from one grouping to another seamlessly. Also, in some embodiments in which the network controls beam measurements, the network controls which BSs the UE monitors beams for, thereby enabling smooth beam transition as above.

In some embodiments, the grouping of a physical layer channel and an associated receive beam assumption by the network may be used by the UE for terrestrial/non-terrestrial networks.

Figure 10:
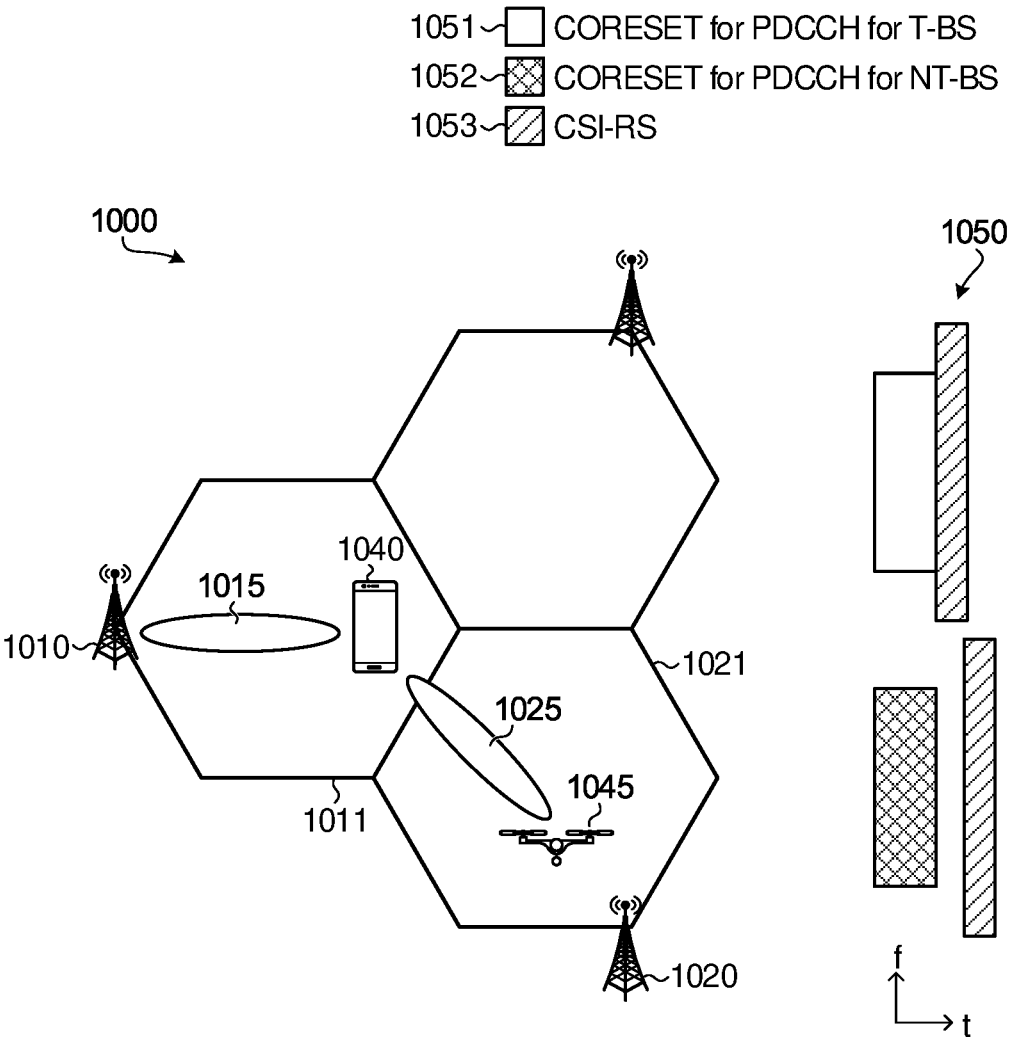
FIG. 10 is a block diagram of a portion of a network including a UE and multiple terrestrial and non-terrestrial BSs that may use methods according to embodiments of the present disclosure.

FIG. 10 illustrates an example a portion of a network 1000 in which a UE 1040 near an edge of a first cell 1011 served by both a terrestrial BS (T-BS) 1010 and a non-terrestrial BS (NT-BS) 1045 that is currently supporting service to a second cell 1021. Sometime after the UE 1040 performs IA and is synchronized with the network 1000 via the BS 1010, the BS 1010 transmits higher layer configuration information that includes one or more groups of a physical layer channel and an associated receive beam assumption. The BS 1010 then transmits lower layer configuration information that identifies one or more active groups of a physical layer channel and an associated receive beam assumption selected from the groups identified by the higher layer signaling, where the receive beam assumptions are associated with reference signals for multi-BS transmission purposes or inter-BS transmission purposes. CSI-RSs are the particular references referred to herein for the most part, however, it should be considered that other reference signals could be used, for example DMRS or other reference signals that are expressly dedicated for this purpose.

In FIG. 10, the T-BS 1010 and the NT-BS 1045 are each shown transmitting a respective CSI-RSs on beams (1015 for BS 1010 and for 1025 for BS 1045) for multi-BS transmission purposes. The CSI-RSs each corresponds to a certain receive beam assumption, and T-BS 1010 and NT-BS 1045 use different CORESETs, allowing the UE to monitor for PDCCH transmissions for the T-BS 1010 and the NT-BS 1045 using the associated receive beam assumption.

FIG. 10 also shows a portion of a time-frequency resource 1050. The portion of the time-frequency resource 1050 is shown on a 2 dimensional plane in which the horizonal axis is time and the vertical axis is frequency. The CORESET 1051 is transmitted on PDCCH for T-BS 1010 followed by the CSI-RS 1053 for T-BS 1010 on each beam 1015 for BS 1010 and the CORESET 1052 is transmitted on PDCCH for NT-BS 1045 followed by the CSI-RS 1053 for NT-BS 1045 beam 1025 for BS 1045.

Depending on the location of the UE, the network can the network can send group configuration information to the UE to configure the UE for using terrestrial and/or non-terrestrial BSs of interest so that the UE can decode PDCCH transmissions scheduling PDSCH transmissions carrying SI/Paging information or UE-specific data.

Figure 11:
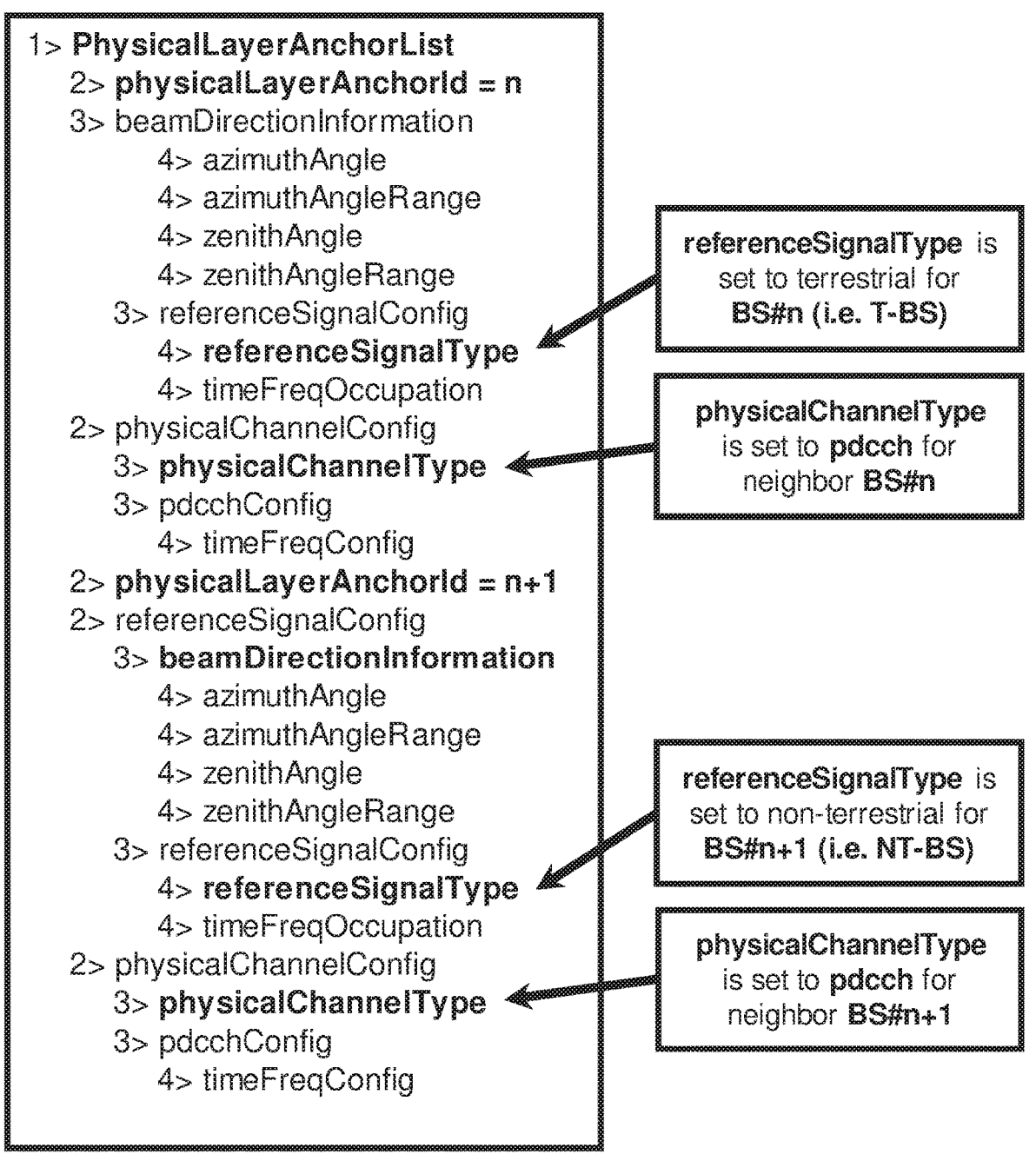
FIG. 11 is a representation of configuration information for use in defining groups of associated physical layer channel and beam assumption used in inter-cell mobility for networks with terrestrial and non-terrestrial BS according to an aspect of the present disclosure.

FIG. 11 is an example of a representation of configuration information that may be provided in higher layer configuration to identify a group of a physical layer channel and an associated receive beam assumption to enable the UE to configure itself as part of terrestrial/non-terrestrial multi-BS processing.

FIG. 11 has a similar hierarchical structure to FIG. 5. For each of the groupings of a physical layer channel and an associated receive beam assumption that are included in the configuration in FIG. 11, the groups are identified in terms of the physical layer channel (for example the PDCCH in FIG. 10) and an associated receive beam assumption (for example beam direction information for the CSI-RS for terrestrial/non-terrestrial multi-BS). The groupings are of the type that are shown to be configured and used in FIG. 3, i.e. Group #1 and Group #2. The receive beam assumption is captured using higher layer parameters, which indicate the region of space where the UE is supposed to steer the UE receive beam. Additionally the beam direction can be accompanied with higher layer information about reference signals. The reference signal configuration further includes higher layer information about the nature of the terrestrial/non-terrestrial BS.

In FIG. 11, for the first grouping, physicalLayerAnchorID=n, beam direction information includes configuration information to define physical channel reference signal configuration ("physicalChannelConfig").

The reference signal configuration includes beam direction configuration information such as a beam direction azimuth angle ("azimuthAngle"), a beam direction azimuth angle range ("azimuthAngleRange"), a beam direction zenith angle ("zenithAngle"), and a beam direction zenith angle range ("zenithAngleRange"). Beam direction angle ranges are used by the network to indicate to the UE the beam width that is covered for a beam direction angle, along with its granularity in e.g. degrees. This allows the network to perform further fine-tuning of the beam direction indication at the UE side, based on e.g. UE movement, network node movement or changing radio conditions. Additional configuration information about the first grouping includes reference signal configuration information (referenceSignalConfig) that includes and identifies a reference signal type ("referenceSignalType") and reference signal time and frequency occupation information ("timefreqOccupation") in a time-frequency resource.

Also for the first grouping, physicalLayerAnchorID=0, physical channel reference signal configuration information includes configuration information to define physical channel configuration information including identification of a physical layer channel type ("physicalChannelType"). In the case of FIG. 11, the physical channel type is PDCCH. This allows the UE to know that any corresponding beam assumption is tied with the PDCCH for a given terrestrial or non-terrestrial BS, allowing the UE to locate the common CORESET and monitor PDCCH carrying SI/Paging information. The configuration also includes physical layer channel configuration information ("pdcchConfig") for the physical layer channel type includes time and frequency configuration information ("timeFreqConfig") i.e. the location in the time-frequency resource.

Time and frequency configuration information for the PDCCH channel may include various information. PDCCH messages are assumed to be received by the UE in a CORESET, which corresponds to a time-frequency region. In a particular example for a time-unit, where a slot is defined as a time-frequency resource block with 14 OFDM symbols and 12 subcarriers, the CORESET configuration may include a slot periodicity, which indicates how often the UE should monitor for PDCCH transmissions on the CORESET expressed in a number of slots. The CORESET configuration may also include the time-frequency resources occupied by the CORESET, thus providing the UE with an exact resource mapping of the CORESET on the time-frequency resource grid.

The PDCCH configuration information may also include a corresponding search space configuration, wherein each search space defines a particular region of the CORESET where the UE monitors for a given PDCCH transmission. Search space configuration information may include further information such as a number of search spaces time-frequency resources occupied by each search space, types of control messages (i.e. downlink assignments) the UE may monitor on a given search space, and channel-coding used to encode the downlink assignments. Examples of channel-coding information include, but are not limited to, a type of channel-coding such as Turbo-coding, convolutional coding, Low-Density Parity Check coding, and Polar coding, and the length of the control messages expressed in number of bits.

The reference signal configuration information may also include information regarding a sequence generation for the reference signal configured on a non-terrestrial physical layer channel identified in the grouping of physical layer channel and associated receive beam assumption. As an example, the reference signal configuration may include parameters identifying a sequence (e.g. Gold sequences), signal generation method (e.g. spread spectrum), and a sequence generation initializing value.

In the context of embodiments that may be used by the UE for terrestrial/non-terrestrial networks, the reference signals on the physical layer channels from the multiple terrestrial/non-terrestrial BSs associated with the grouping of the receive beam assumption and the physical layer channel may occupy the same time-frequency resource block, assuming that time-frequency resource block are allocated on a common granularity in the time-frequency grid e.g. OFDM symbols in the time domain and subcarriers in the frequency domain. The reference signal associated with the receive beam assumption and the physical layer channel may not be transmitted together at all times. For example, the reference signal may be a periodic reference signal transmitted with a certain periodicity expressed in number of slots, whereas the PDCCH is transmitted in every slot.

Configuration information for a second grouping ("physical LayerAnchorID=n+1") is also included in FIG. 11 including all the same configuration information as the first grouping. The network can send similar information for multiple groups.

The configuration information in FIG. 11 is transmitted in the high layer signaling. Once the UE is provided with the configuration information for each of the groups that the network provides the UE, the network can send a simple identifier, for example the physicalLayerAnchorID to identify the active groups in the MAC-CE.

Using grouping of a physical layer channel and an associated receive beam assumption by the network for terrestrial and non-terrestrial purposes may provide a cross-tier mobility experience in which UEs can maintain full connectivity with the network using non-terrestrial groupings when beam-failure occurs on one of the terrestrial groupings. For example, the UE may continue to receive control information and UE-specific data. Also, in some embodiments in which the network controls user experience, the network controls which BSs the UE listens to at any given time. For example, the UE doesn't waste time and processing power detecting and measuring radio links from terrestrial or non-terrestrial BSs that the network determines as being not "of interest" to the UE.

A UE in a wireless network, upon completing an initial access procedure, may report the UE's capability to the network pertaining to various features and physical layer capabilities that the UE supports for the purpose of wireless communications. While this is not shown in the example of signaling in FIG. 3, such UE capability information may be sent in a capability report by the UE to the network after the IA procedure 325 and before the higher layer signaling 330.

In some embodiments, the UE may indicate in the capability report to the network that the UE can support a maximum number of groupings of physical layer channel and associated receive beam assumption (i.e. any number higher than 1). Then, the network can configure the UE with up to a maximum number of groupings that the UE reported.

In some embodiments, the UE may indicate in the capability report to the network that the UE can support a maximum number of groupings of physical layer channel and associated receive beam assumption (i.e. any number higher than 1) for any one or more of the following functions: UE mobility, multi-BS transmission, multi-TRP transmission, beam management, and terrestrial and non-terrestrial (T/NT)transmission. Then, the network can configure the UE with up to the maximum number of grouping that the UE reported for any one or more of the functions of: UE mobility, multi-BS transmission, multi-TRP transmission, beam management and T/NT-transmission, respectively.

In some embodiments, the UE may indicate in the capability report to the network that the UE can support using groupings of physical layer channel and associated receive beam assumption simultaneously for up to a maximum number of functions (i.e. any number higher than 1), wherein the functions are one or more of the following functions: UE mobility, multi-BS transmission, multi-TRP transmission, beam management, and T/NT transmission. Then, the network can configure the UE with groupings with up to the maximum number of functions. The network can do so by e.g. setting the "physicalChannelType" parameter of the grouping of physical layer channel and associated receive beam assumption with the corresponding functions that the UE is supposed to implement. For example, "pbch-pdcch" if the UE is supposed to use the grouping for UE mobility and multi-TRP or multi-BS transmission.

In some embodiments, the UE may indicate in the capability report to the network that the UE can support a maximum number of active groupings of physical layer channel and associated receive beam assumption (i.e. any number higher than 1) at any given time. Then, the network can activate any number of groupings that is up to the maximum number indicated by the UE.

In some embodiments, the UE may indicate in the capability report to the network that the UE can support a maximum number of active groupings (i.e. any number higher than 1) per given function, wherein the UE may support the same maximum number or different maximum numbers per given function. Then, the network can activate any number of groupings of physical layer channel and associated receive beam assumption that is up for the maximum number indicated by the UE for the function for which the grouping is configured.

In another embodiment, the UE may indicate in the capability report to the network that the UE can support simultaneous reception on physical layers associated with the groupings of physical layer channel and associated receive beam assumption. This means that the physical layer channel associated with the groupings may occupy the same time resources (e.g. OFDM symbols. Then the network can configure the UE with one or more groupings such that the reference signals and/or the physical layer channels are occupying the same time resources.

In another embodiment, the UE may indicate in the capability report to the network that the UE can support simultaneous reception of groupings of physical layer channel and associated receive beam assumption on the same receive beam assumption. The groupings may occupy the same time resources (e.g. OFDM symbols) and the UE uses the same receive beam assumption in order to detect and measure the reference signal and detect, demodulate and decode the physical layer channel. Then, the network can configure the UE with one or more groupings of physical layer channel and associated receive beam assumption such that the reference signals and/or the physical layer channels are occupying the same time resources (e.g. OFDM symbols) and the azimuth and zenith angles are equal within a certain margin expressed in degrees. This margin may be configured by the network, indicated in the UE's capability report or specified in a telecommunication standard specification.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. An apparatus comprising:
a processor coupled with a computer-readable storage memory, having stored thereon, computer executable instructions that when executed, cause the apparatus to:
transmit configuration information, the configuration information comprising at least one grouping of information, each grouping of information comprising an identification of a physical layer channel and information pertaining to a receive beam for a receiver to receive the physical layer channel; and
transmit an identification of a selected grouping of information of the at least one grouping of information to configure user equipment (UE) based on the selected grouping,
wherein the information pertaining to the receive beam is reference signal configuration information, and the reference signal configuration information comprises one or more of:
reference signal type information;
reference signal time periodicity information; or
reference signal frequency occupation information.

2. The apparatus of claim 1, wherein the selected grouping of information can be used for UE functionality that comprises at least one of:
UE mobility within a network;
UE receiving physical layer signaling from multiple network devices;
UE beam management; or
UE operation using a terrestrial network or a non-terrestrial network.

3. The apparatus of claim 1, wherein the computer executable instructions that when executed cause the apparatus to transmit the information pertaining to the receive beam, cause the apparatus to transmit beam direction information.

4. The apparatus of claim 3, wherein the beam direction information comprises one or more of:
a beam direction azimuth angle;
a beam direction azimuth angle range;
a beam direction zenith angle;
a beam direction zenith angle range; or
information associating a transmit beam and a receive beam at the UE.

5. The apparatus of claim 1, wherein the computer executable instructions that when executed cause the apparatus to transmit the configuration information comprising the grouping of the identification of the physical layer channel and the information pertaining to a receive beam, cause the apparatus to transmit one of:

an identification of a physical broadcast channel (PBCH) and channel state information reference signal (CSI-RS) information;
an identification of a physical downlink control channel (PDCCH) and CSI-RS information; or
an identification of a physical uplink control channel (PUCCH) and CSI-RS information.

6. The apparatus of claim 1, wherein:
transmitting the configuration information comprises transmitting the configuration information in higher layer signaling; and
transmitting the identification of the selected grouping of information comprises transmitting the identification in lower layer signaling.

7. A method comprising:
a user equipment (UE) receiving configuration information, the configuration information comprising at least one grouping of information, each grouping of information comprising an identification of a physical layer channel and information pertaining to a receive beam for a receiver to receive signaling on the physical layer channel; and
the UE receiving an identification of a selected grouping of information of the at least one grouping of information to configure the UE based on the selected grouping,
wherein the information pertaining to the receive beam is reference signal configuration information, and the reference signal configuration information comprises one or more of:
reference signal type information;
reference signal time periodicity information; or
reference signal frequency occupation information.

8. The method of claim 7, wherein the selected grouping of information can be used for UE functionality that comprises at least one of:
UE mobility within a network;
UE receiving physical layer signaling from multiple network devices;
UE beam management; or
UE operation using a terrestrial network or a non-terrestrial network.

9. The method of claim 7, wherein receiving the identification of the physical layer channel comprises receiving one or more of:
identification of a physical layer channel type; or
physical layer channel configuration information for the physical layer channel type.

10. The method of claim 7, wherein receiving the information pertaining to the receive beam comprises receiving beam direction information.

11. The method of claim 10, wherein the beam direction information comprises one or more of:
a beam direction azimuth angle;
a beam direction azimuth angle range;
a beam direction zenith angle;
a beam direction zenith angle range; or
information associating a transmit beam and a receive beam at the UE.

12. The method of claim 7, wherein the receiving the configuration information comprising the grouping of the identification of the physical layer channel and the information pertaining to a receive beam comprises receiving one of:
an identification of a physical broadcast channel (PBCH) and channel state information reference signal (CSI-RS) information;

an identification of a physical downlink control channel (PDCCH) and CSI-RS information; or an identification of a physical uplink control channel (PUCCH) and CSI-RS information.

13. The method of claim 7, wherein:

receiving configuration information comprises transmitting the configuration information in a higher layer signaling; and receiving the identification of the selected grouping of information comprises transmitting the identification in a lower layer signaling.

14. An apparatus comprising:

a processor coupled with a computer-readable storage memory, having stored thereon, computer executable instructions that when executed, cause the apparatus to:

receive configuration information, the configuration information comprising at least one grouping of information, each grouping of information comprising an identification of a physical layer channel and information pertaining to a receive beam for a receiver to receive signaling on the physical layer channel; and receive an identification of a selected grouping of information of the at least one grouping of information to configure the apparatus based on the selected grouping, wherein the information pertaining to the receive beam is reference signal configuration information, and the reference signal configuration information comprises one or more of:

reference signal type information;

reference signal time periodicity information; or reference signal frequency occupation information.

15. The apparatus of claim 14, wherein the selected grouping of information can be used for (user equipment) UE functionality that comprises at least one of:

UE mobility within a network;

UE receiving physical layer signaling from multiple network devices;

UE beam management; or

UE operation using a terrestrial network or a non-terrestrial network.

16. The apparatus of claim 14, wherein the computer executable instructions that when executed cause the apparatus to receive the identification of the physical layer channel, cause the apparatus to receive one or more of:

identification of a physical layer channel type; or physical layer channel configuration information for the physical layer channel type.

17. The apparatus of claim 14, wherein the computer executable instructions that when executed cause the apparatus to receive the information pertaining to the receive beam, cause the apparatus to receive beam direction information.

18. The apparatus of claim 17, wherein the beam direction information comprises one or more of:

a beam direction azimuth angle;

a beam direction azimuth angle range;

a beam direction zenith angle;

a beam direction zenith angle range; or information associating a transmit beam and a receive beam at the UE.

19. The apparatus of claim 14, wherein the computer executable instructions that when executed cause the apparatus to receive the configuration information comprising the grouping of the identification of the physical layer channel and the information pertaining to a receive beam, cause the apparatus to receive one of:

an identification of a physical broadcast channel (PBCH) and channel state information reference signal (CSI-RS) information;

an identification of a physical downlink control channel (PDCCH) and CSI-RS information; or an identification of a physical uplink control channel (PUCCH) and CSI-RS information.

20. The apparatus of claim 14, wherein:

receiving the configuration information comprises transmitting the configuration information in higher layer signaling; and receiving the identification of the selected grouping of information comprises transmitting the identification in lower layer signaling.

\* \* \* \* \*